(12) United States Patent
Ciesicki

(10) Patent No.: US 12,702,535 B2
(45) Date of Patent: Aug. 11, 2026

(54) ORAL DIFFUSING DEVICE

(71) Applicant: HydrOral, SAS, Acigné (FR)

(72) Inventor: Matthew Ciesicki, Acigné (FR)

(73) Assignee: HYDRORAL, SAS, Acigné (FR)

( * ) Notice: Subject to any disclaimer, the term of this patent is extended or adjusted under 35 U.S.C. 154(b) by 232 days.

(21) Appl. No.: 18/395,392

(22) Filed: Dec. 22, 2023

(65) Prior Publication Data

US 2024/0122690 A1 Apr. 18, 2024

Related U.S. Application Data

(63) Continuation-in-part of application No. 17/656,568, filed on Mar. 25, 2022, now Pat. No. 12,527,656.

(60) Provisional application No. 63/166,554, filed on Mar. 26, 2021.

(51) Int. Cl.
*A61C 19/06* (2006.01)

(52) U.S. Cl.
CPC .................................. *A61C 19/063* (2013.01)

(58) Field of Classification Search
CPC ....... A61C 19/06; A61C 19/063; A61C 19/00; A61C 19/066; A61C 7/08; A61K 9/006; A61J 7/0092
See application file for complete search history.

(56) References Cited

U.S. PATENT DOCUMENTS 1,042,618 A 10/1912 Stone
1,797,946 A 3/1931 Emil
3,503,127 A 3/1970 Kasdin et al.
4,484,895 A 11/1984 Smiley et al.
4,861,268 A 8/1989 Garay et al.
4,959,052 A 9/1990 Cox
5,037,295 A 8/1991 Bergersen
5,074,786 A 12/1991 Woodward
5,194,003 A 3/1993 Garay et al.
5,573,399 A 11/1996 Mcclintock, II
(Continued)

FOREIGN PATENT DOCUMENTS

WO 2007140784 A2 12/2007
WO 2018017553 A2 1/2018
(Continued)

OTHER PUBLICATIONS

International Search Report and Written Opinion of the International Searching Authority; Appplication No. PCT/IB2024/050533; Completed: Sep. 4, 2021; Mailing Date: Nov. 7, 2024; 21 Pages.
(Continued)

*Primary Examiner* — Heidi M Eide
*Assistant Examiner* — Lina Faraj
(74) *Attorney, Agent, or Firm* — Whitmyer IP Group LLC

(57) ABSTRACT

A system for delivering an oral product includes an appliance capable of fitting inside a user's mouth, the appliance having a body that is configured to cover the user's maxillary teeth and a reservoir for receiving the product. The reservoir has at least one port for delivering the product into the user's mouth at a predetermined rate. The reservoir has a first part and a second part, wherein the second part is affixed to the body and the first part is releasably attached to the second part. Opposite ends of the reservoir each include a peg-and-hole connector to releasably attach the first part to the second part.

21 Claims, 49 Drawing Sheets

(56) References Cited

U.S. PATENT DOCUMENTS

| | | | | |
|---|---|---|---|---|
| 5,842,860 | A | 12/1998 | Funt | |
| 2001/0038994 | A1 | 11/2001 | Komiyama | |
| 2009/0105523 | A1 | 4/2009 | Kassayan et al. | |
| 2009/0136893 | A1 | 5/2009 | Zegarelli | |
| 2009/0148812 | A1* | 6/2009 | Pines | A61C 19/063 433/80 |
| 2010/0049128 | A1* | 2/2010 | McKenzie | A61M 5/14248 604/174 |
| 2012/0202172 | A1 | 8/2012 | Raghuprasad | |
| 2012/0220986 | A1 | 8/2012 | Wolff et al. | |
| 2013/0087157 | A1 | 4/2013 | Hawkins | |
| 2014/0014119 | A1 | 1/2014 | Napoli | |
| 2014/0023994 | A1 | 1/2014 | Zegarelli | |
| 2015/0238292 | A1* | 8/2015 | Boe | A61C 19/063 433/171 |
| 2016/0278899 | A1 | 9/2016 | Heller et al. | |
| 2017/0172961 | A1 | 6/2017 | Heller et al. | |
| 2017/0216148 | A1 | 8/2017 | Altounian | |
| 2018/0338856 | A1* | 11/2018 | Rago | A61F 5/08 |
| 2019/0282449 | A1* | 9/2019 | Kudek | A61J 7/0053 |
| 2020/0038295 | A1 | 2/2020 | Lynch et al. | |
| 2021/0353387 | A1 | 11/2021 | Velamakanni et al. | |
| 2022/0117849 | A1 | 4/2022 | Patil-Graziano | |
| 2022/0304786 | A1 | 9/2022 | Ciesicki | |
| 2023/0355939 | A1 | 11/2023 | Heller et al. | |

FOREIGN PATENT DOCUMENTS

| | | | |
|---|---|---|---|
| WO | 2020208620 | A1 | 10/2020 |
| WO | 2021048406 | A1 | 3/2021 |

OTHER PUBLICATIONS

Communication Relating to the Results of the Partial International Search Report; Application No. PCT/IB2024/050533; Issued: Sep. 16, 2024; 17 Pages.

Alexander, Keith; "How to Ease the Nightly Symptoms of Dry Mouth: An Effectice Oral Appliance"; 2022 DB Orthodontics Limited Website; Jan. 25, 2019; 12 Pages.

Great Lakes Dental Technologies; "AmericoNightguard"; https://www.greatlakesdentaltech.com/; Retrieved on: Nov. 11, 2022; 1 Page.

US Office Action; U.S. Appl. No. 17/656,568; Issued: May 10, 2023.

US Office Action; U.S. Appl. No. 17/656,568; Issued: Oct. 26, 2023.

Alexander, Keith; "How to Ease the Nightly Symptoms of Dry Mouth: An Effective Oral Appliance"; 2022 DB Orthodontics Limited Website; Jan. 25, 2019; 7 Pages.

* cited by examiner

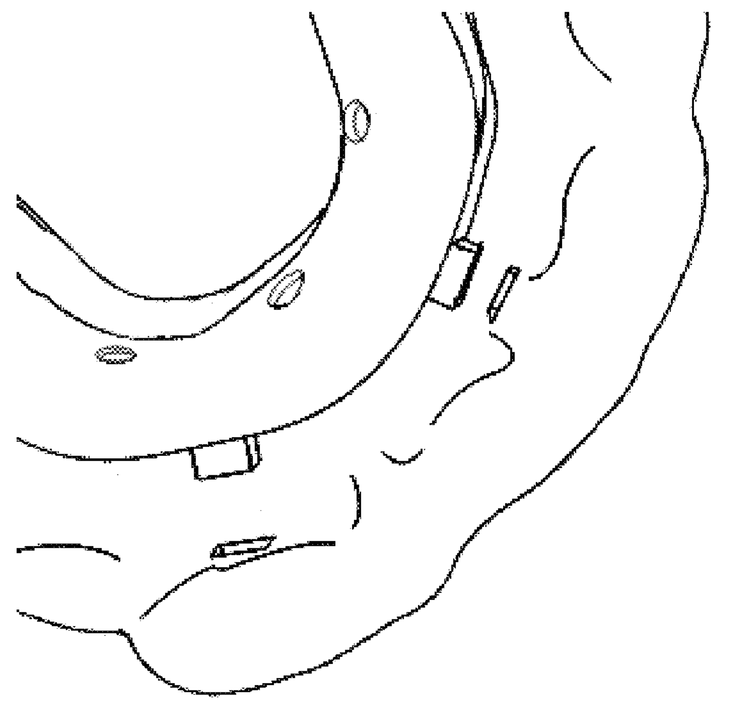
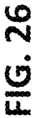
FIG. 26
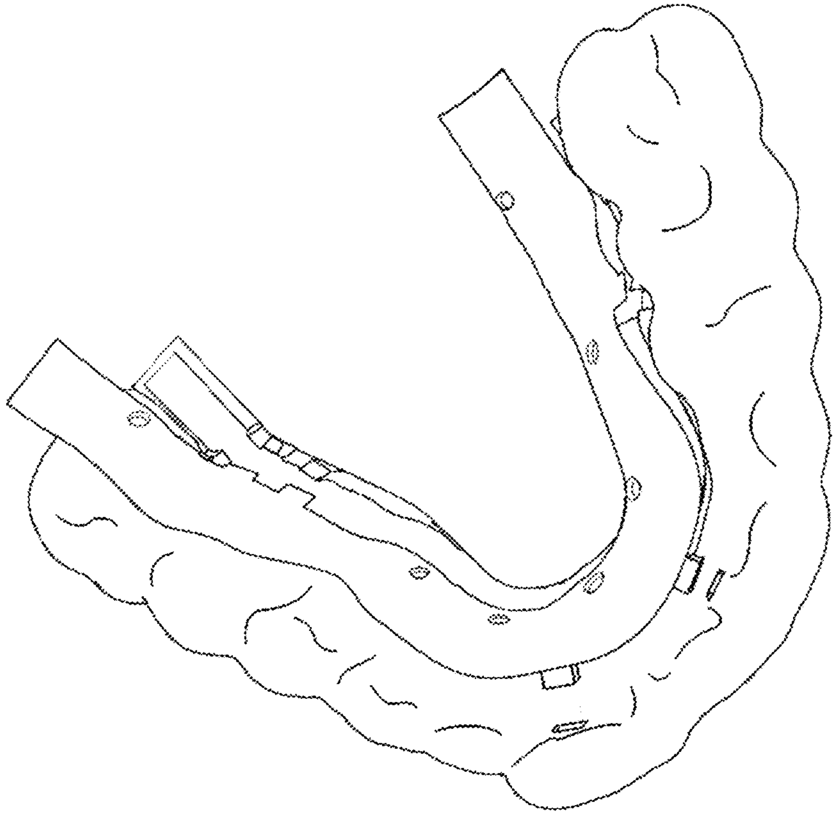

35
25
32
22
10

21
36
25
31

ORAL DIFFUSING DEVICE

CROSS-REFERENCE TO RELATED APPLICATIONS

This application is a continuation-in-part of U.S. application Ser. No. 17/656,568 filed Mar. 25, 2022, which claims the benefit under 35 U.S.C. § 119(e), of U.S. Provisional Application No. 63/166,554 filed on Mar. 26, 2021.

TECHNICAL FIELD

The present invention relates to a device for diffusing a product into a person's mouth, oral cavity, throat, and/or extra-thoracic region, including during sleep.

BACKGROUND

Dry mouth, often referred to as xerostomia, the feeling of the lack of saliva, or hyposalivation, the lack of salivation, is caused by a decrease in saliva production which affects millions of people. One out of four adults suffer from dry mouth, rising to more than 40% of the US population aged 55 years or older, with 38.5 million cases and increasing rapidly.

Saliva is a vital component of tasting and digestion; its lubricative properties are essential for swallowing and speech. Saliva also helps defend against tooth decay and oral infections. There are multiple causes of dry mouth. 64% of dry mouth cases are associated with medication use; the incidence rises with the number of medications taken (polypharmacy). Oral cancer treatments (radiotherapy and chemotherapy), diabetes, Sjögren's syndrome, and Parkinson's disease are also connected with salivary glands hypofunction and reduced saliva flows.

The effects of dry mouth are numerous: difficulty in swallowing, diminished sense of taste, sleep interruption due to thirst, oral infections and tooth decay, sore throat and mouth and difficulty speaking. All lead to lowered quality of life.

Treatment options consist almost exclusively of short-acting salivary flow stimulants to moisturize the mouth: oral rinses, toothpaste, chewing gum or sprays to temporarily alleviate symptoms of dry mouth. The existing methods for hydrating the mouth such as mouth rinse, toothpaste, lozenges, sprays, all require the patient to be awake for use, as an active hydration. The problem is that these solutions only are effective for a short time before requiring reapplication. Of course, this is not feasible while sleeping—treatment only occurs when the patient is awake. Additionally, such known methods present a choking hazard if used/applied when the patient is not awake.

The global dry mouth therapeutics market size was $602 M in 2016, $2.67B in 2022, and estimated to be $3.49B in 2026 ($4.326B in 2030). Rising incidence of dry mouth owing to increased consumption of medications, as a side-effect of chemotherapy and radiotherapy, from nerve damage or dehydration, and conditions affecting salivary glands has been boosting demand for dry mouth relief products and is a key factor expected to drive market revenue growth over the forecast period. Availability of a wide range of products, increasing affordability, and growing awareness regarding the condition are some other key factors expected to fuel revenue growth of the market over the forecast period.

Prescription medicines such as antidepressants, antihypertensives, sedatives, antiemetics and antipsychotics affect salivary glands. The American Medical Association has identified more than 400 drugs that can cause xerostomia. Use of these drugs and especially polypharmacy—administration of multiple drugs—is increasing and is the number one factor in chronic dry mouth cases. The CDC reports 650,000 patients per year are treated in the US for cancer with chemotherapy. Chemotherapy is the second largest dry mouth cause factor, after polypharmacy.

Beyond dry mouth, other conditions may benefit from the distribution of products overnight. For example, solutions to treat sore throats or cough symptoms, or products that lubricate the throat/glottis to help reduce snoring may benefit from oral diffusion. Additionally, it is possible to diffuse treatment throughout the entire extra-thoracic region including the oral cavity, and pharynx. Aside from hydration or humectant products, medicines, such as pain relievers, may be delivered in passive, slow acting, and constant diffusion.

Additionally, there is a need for hydration for long-term patients, such as coma patients, or patients who are using compressed oxygen. The use of passive hydration may allow higher oxygen levels to be utilized for patients. Commercial deep-sea and recreational divers and first responders who use bottled oxygen may benefit from oral hydration. Athletes, especially those competing in endurance sports, may benefit from oral hydration or diffusion of gels that include electrolytes, salts, carbohydrates, etc.

There are no passive methods for dispersal of the oral products which addresses all of the aforementioned issues. One known product, XYLIMELTS, sticks to the wall of the mouth, however, patients need to be awake during administration to prevent a choking hazard. In every case the patient needs to be awake to initiate and complete treatment. There are no products that allow treatment while the patient sleeps; sleep disruption due to dry mouth symptoms or other ailments is a major issue. In addition, an overnight product could be worn during the day to provide maximal dry mouth or other ailment relief.

These and other problems are solved by the present disclosure.

SUMMARY

The needs set forth herein as well as further and other needs and advantages are addressed by the present embodiments, which illustrate solutions and advantages described below.

Disclosed herein is a device and system that passively delivers oral moisturizing products, medicines, or other treatments, including while the patient is sleeping, which provides benefits of convenience compared with an active delivery of the medicines or products. Multiple embodiments are envisioned.

It is a goal of the present invention to provide a device for treating xerostomia and/or hyposalivation—chronic dry mouth.

It is another goal of the present invention to provide a passive device for treating xerostomia and/or hyposalivation.

It is another goal of the present invention to provide a device for treating xerostomia and/or hyposalivation while the user sleeps.

It is another goal of the present invention to provide a device for diffusion of medicines inside the mouth.

It is another goal of the present invention to provide a device for the treatment of snoring, sore throat, and cough.

It is another goal of the present invention to provide a device for athletic/performance enhancement through diffusion of electrolytes and hydrating materials.

It is another goal of the present invention to provide a device to help equalize ear pressure by inducing swallowing.

It is another goal of the present invention to provide a device to help patients who may be unconscious for short durations such as during a lengthy surgery, and/or for long durations such as elderly, possible bed-ridden or dementia patients, or coma patients.

It is another goal of the present invention to provide a device which diffuses various products inside the mouth with low or no choking hazard.

It is another goal of the present invention to provide a device which addresses the aforementioned advantages and solutions in tandem with dentures, false teeth, or other prostheses.

In one aspect of the invention, a system for delivering an oral treatment is provided, having an appliance disposed inside a user's mouth and having a reservoir for receiving a predetermined amount of a product. The reservoir having ports for delivering the product into the user's mouth at a predetermined rate.

In one aspect of the invention, a system for delivering an oral treatment is provided having a support having a palate-contacting or teeth-contacting portion and a reservoir disposed on the palate-contacting or teeth-contacting portion of the support. The reservoir may be configured to deliver a predetermined amount of a product to a user's mouth during the user's non-active treating of the mouth.

In one aspect of the invention, a system for delivering an oral treatment is provided having a first material configured to be inserted in a user's mouth and a reservoir disposed in the first material. The system may also have a closure piece configured to coordinate with the first material to receive a product in the reservoir. The reservoir may be configured to deliver a predetermined amount of the product to the user's mouth during the user's using of the system at a predetermined rate.

In another aspect of the invention, there is provided a system for delivering an oral product (e.g., oral moisturizer, oral medication, sore throat medication, mouthwash, etc.) comprising an appliance capable of fitting inside a user's mouth, the appliance having a body that is configured to cover the user's maxillary teeth, the appliance having a reservoir for receiving a product. The reservoir has at least one port for delivering the product into the user's mouth at a predetermined rate. The reservoir comprises a first part and a second part, wherein the second part is affixed to the body and the first part is releasably attached to the second part. Opposite ends of the reservoir each include a peg-and-hole connector to releasably attach the first part to the second part.

In yet another aspect of the invention, there is provided an oral care system comprising an appliance capable of fitting inside a user's mouth, the appliance having a body that is configured to cover the user's teeth. The appliance has a reservoir, the reservoir having at least one port for delivering the product into the user's mouth at a predetermined rate. The reservoir comprises a first part and a second part, wherein the second part is affixed to the body and the first part is releasably attached to the second part. Opposite ends of the reservoir each include a peg-and-hole connector to releasably attach the first part to the second part. The oral care system further comprises an oral product that is insertable into the reservoir. Prior to insertion, the oral product is contained in a product packaging. In some embodiments, at least one unit of the oral product is contained in the product packaging. In other embodiments, the product packaging includes a plurality of units of the oral product. In another aspect of the invention, there is provided a oral care kit, which comprises the oral care system described above, at least one unit of the oral product, and a product package configured to store, preferably in a sealed containment, the oral care system and the at least one unit of the oral product.

Other features and aspects of the present teachings will become apparent from the following detailed description, taken in conjunction with the accompanying drawings, which illustrate by way of example the features in accordance with embodiments of the present teachings. The summary is not intended to limit the scope of the present teachings

BRIEF DESCRIPTION OF THE DRAWINGS

FIG. 26 shows a top perspective and close-up view of a clamshell canal, which is the reservoir that holds the product or other medication, connecting to a device according to an embodiment of the present invention.

DETAILED DESCRIPTION

The present teachings provide a system or a device for delivering an oral treatment, which includes a reservoir disposed on a palate-contacting or teeth-contacting portion of a piece wearable in a user's mouth, and the reservoir is configured to deliver a predetermined amount of the oral treatment to a user's mouth during the user's non-active treating of the mouth such as during sleep. The oral treatment may be medicines or hydrating products, for treating xerostomia and/or hyposalivation, post-operative anti-fungal drugs for treating infection, for treating snoring, sore throat, and cough, for athletic/performance enhancement through diffusion of electrolytes and hydrating materials, and/or for helping patients who may be unconscious for short duration such as during a lengthy surgery, and/or for long duration such as elderly, possible bed-ridden or dementia patients, or coma patients using oxygen. The reservoir may be in various shapes. The reservoir may be formed with various materials. The reservoir may use various releasing mechanisms for delivering the oral treatment. The reservoir may use various locking mechanisms for receiving the oral treatment. The oral treatment may be for treatment of the mouth, teeth, gums, tongue, oral cavity, throat, and extra-thoracic region of the user.

Figure 1:
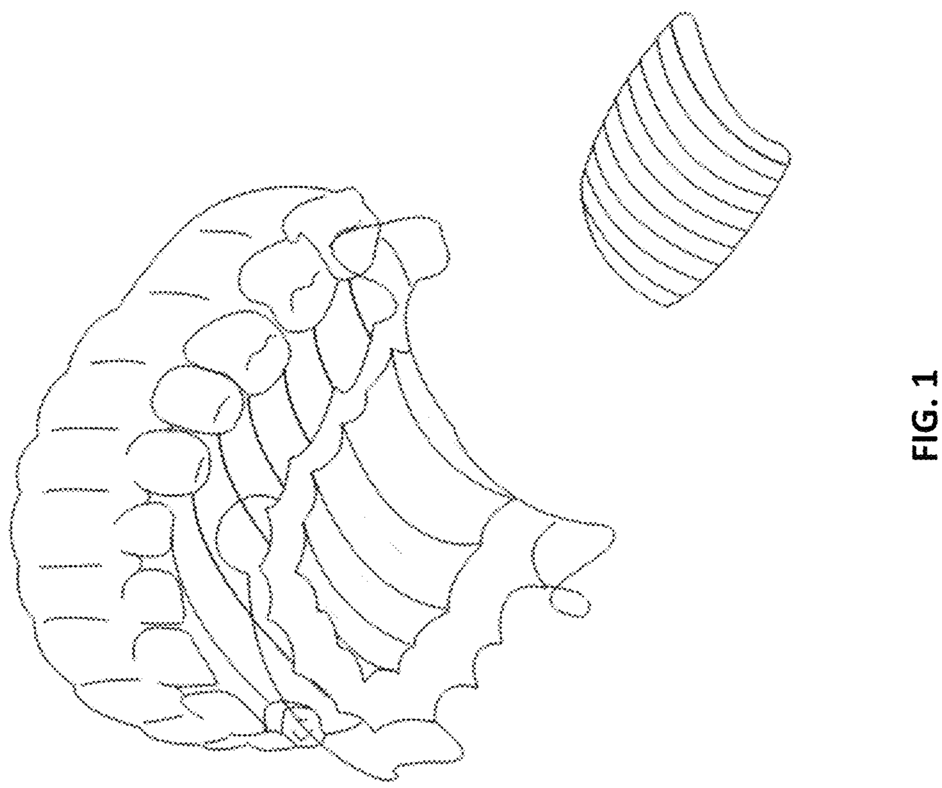
FIG. 1 is an isometric view of an embodiment of the present invention.

FIG. 1 illustrates a system or device according to an embodiment of the present teachings. As shown in FIG. 1, the device may take the shape of an oral upper palate Hawley, or 'wire', appliance, which is placed inside and/or between the upper teeth. The standard 0.7 mm plastic body may gently rests against the upper palate, or roof of the mouth. In one embodiment the plastic body may be positioned such that it does not contact the upper palate and/or is held away from the upper palate. The plastic body may be adapted to incorporate a permeable material, such as a polyethylene or other foam, on the inferior surface of the appliance base; such material may be saturated with a small volume of oral moisturizer (of which there are many FDA approved brands and brands that do not require FDA approval). The permeable material may be calibrated to continually release very small quantities (approximately 2-3 milliliters of oral moisturizer over an 8 to 10-hour period) of oral moisturizer into the patient's mouth, thus ameliorating the patient's dry mouth condition. The constant and passive delivery of product may be delivered while the patient is sleeping and may present a low or no choking hazard.

The oral moisturizer may be replaced with various products to treat different ailments or for different applications. For example, product may be a menthol, electrolytes, medicine, or other orally diffused substance.

The permeable material may be permanently mounted to the base of the appliance, and thus replenished daily. The permeable material may also take the form of a small sponge-like cartridge that is affixed to the inferior surface of the appliance. In this case the permeable material may be disposable, and changed daily, or as needed. Multiple methods of affixing the permeable cartridge to the appliance base are foreseen. Further, the plastic base of the appliance itself may be hollowed to create a refillable reservoir and the inferior surface micro-perforated to allow permeability for appropriate dispersal of oral moisturizer. The permeable material may be inside of or attached to the plastic base and may be positioned such that the permeable material does not contact the user's upper palate.

While envisioned for use at night, the device may also be worn during waking hours.

Figure 2:
FIG. 2 is an isometric view of an embodiment of the present invention.
Figure 2:
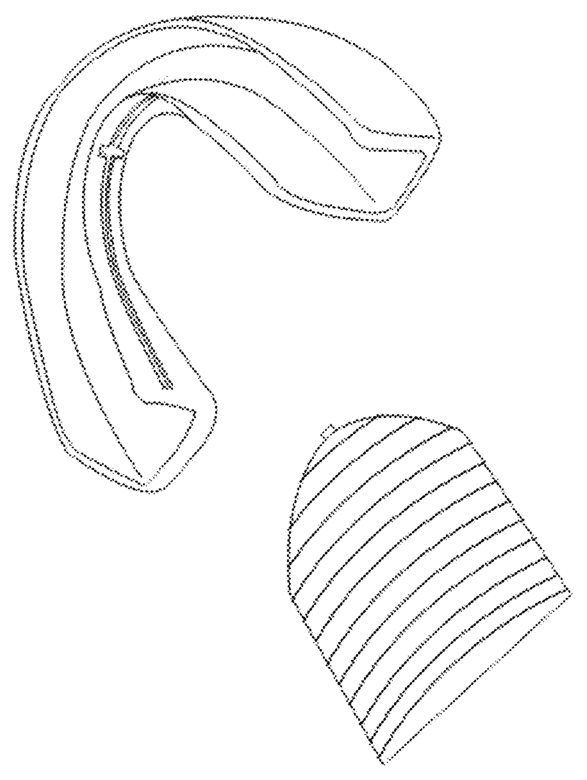

FIG. 2 illustrates a system or device according to an embodiment of the present teachings. As shown in FIG. 2, another embodiment resembles the form of an Essix, vacuum or thermoformed appliance. The Essix appliance (and related 'aligner' products such as 'Visalign') are made of a clear plastic and fit over the teeth snugly. Vacuum pressure and friction hold this style of appliance in place. There is usually no internal base situated under the palate—although the appliance shape may be modified to include one. In this case, dispersal of oral humectant would be largely as described above.

Alternately, a rigid or semi-rigid permeable cartridge may be inserted into small tracks, grooves, or channels, on the medial vertical surface to provide a changeable or rechargeable delivery system. Other methods of affixing the permeable cartridge are envisioned.

Additionally, it can be visualized that an Essix-style device may be fitted with permeable material on the lateral, medial, or both, sides of the device structure. The product, cartridge, or foam pads may be inserted into the device.

Finally, the form of this device may have slightly larger dimensions to contact the gum-line—more reminiscent of an athletic mouthguard. The device may take the form of an anti-bruxism (teeth grinding) device or snore ameliorating device which displaces the glottis.

While some embodiments described herein interface with a user's palate, it may also be envisioned that the device may sit in other areas of a user's mouth, such as below the tongue, near salivary glands, on the user's gums, teeth, or jaw, on false teeth, full or partial dentures, or other prosthetics. The device may be configured to conform to a user's mouth including teeth, false teeth, dentures, gaps in the teeth, removed teeth, chipped, broken, or crooked teeth, teeth modifications, other prosthetics, or the user's gums or jaw.

Figure 3:
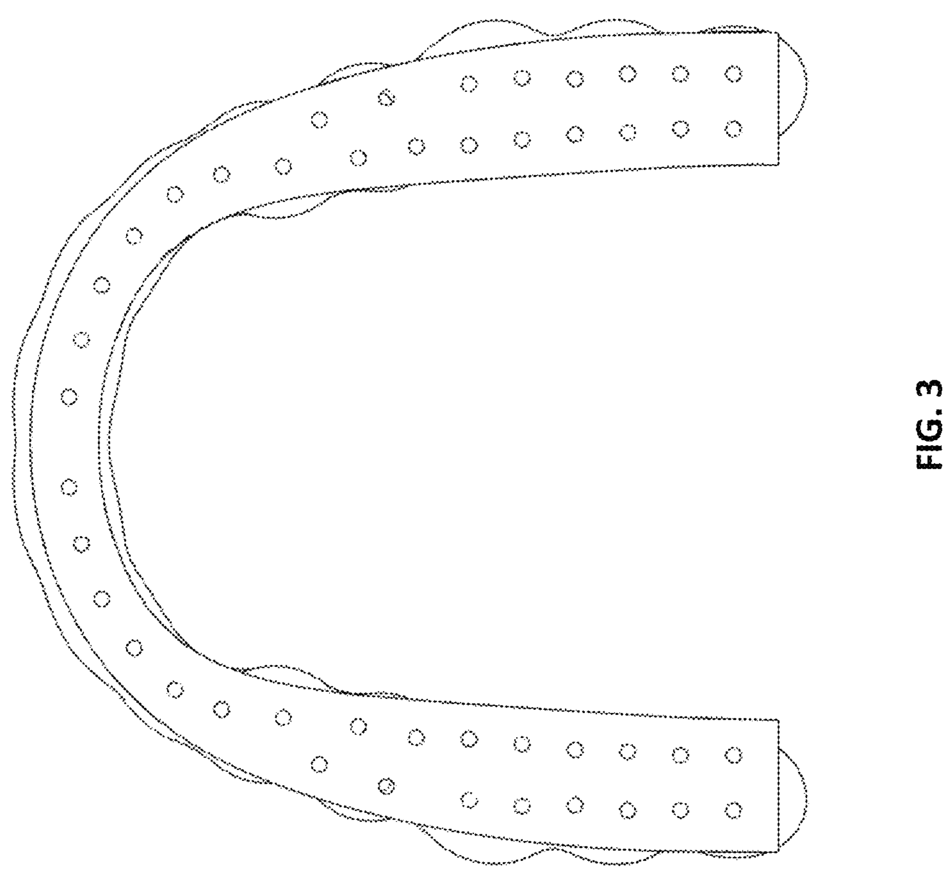
FIG. 3 is a bottom view of an embodiment of the present invention.
Figure 4:
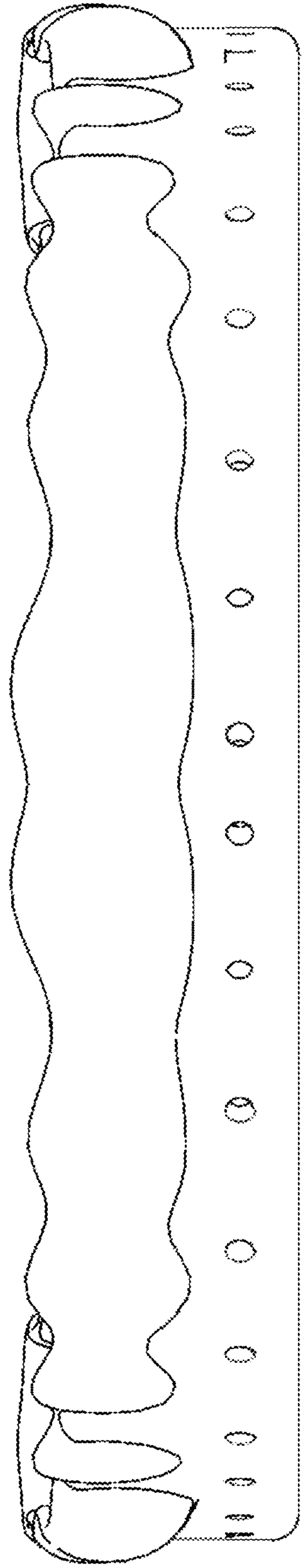
FIG. 4 is a front view of the embodiment of FIG. 3.
Figure 5:
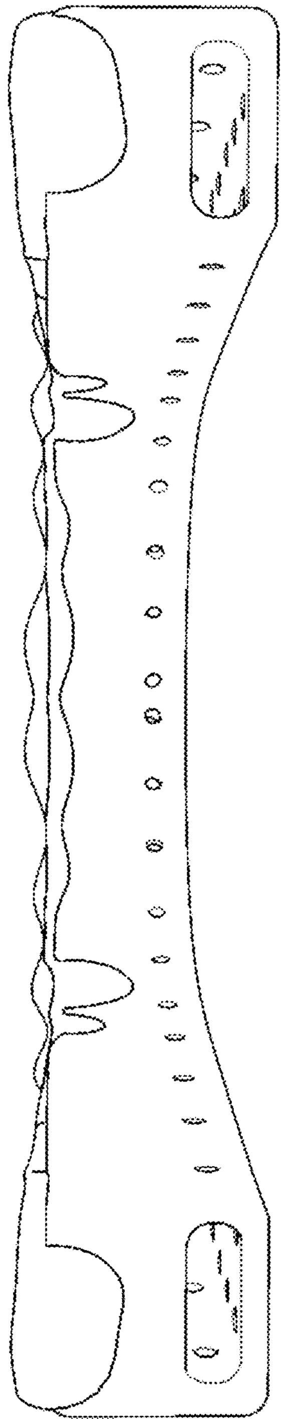
FIG. 5 is a back view of the embodiment of FIG. 3.

FIGS. 3-5 illustrates a system or device according to an embodiment of the present teachings. As shown in the embodiment of FIGS. 3-5, a canal can extend around the appliance. The appliance may be custom fit to a user's mouth using known methods or may be a generic model. The product may be inserted into the canal to be dispensed over time through ports along the appliance. Products may be gels, viscous sprays, liquids, solids, or other diffusible material capable of being inserted into the canal. The ports on the appliance may be sized, shaped, and positioned to ensure that the product is dispensed at a proper rate. Depending on the size of the patient's appliance, the volume may be about 1.5 ml of product—which is equivalent to an 8-to-10-hour dosage of product, but other volumes/amounts of product or oral treatment to be stored in an invention according to the present teachings are contemplated.

Figure 6:
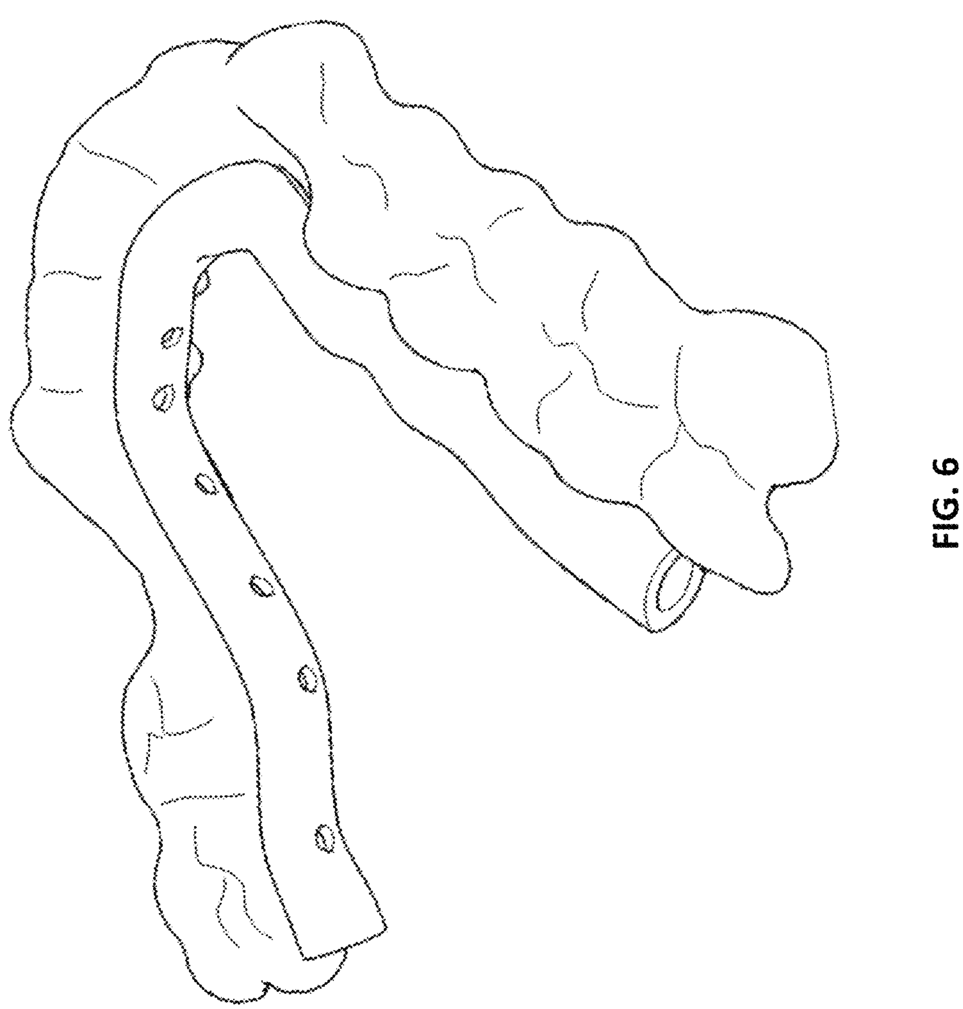
FIG. 6 shows a perspective view of an appliance for an upper palate device according to an embodiment of the present invention.
Figure 7A:
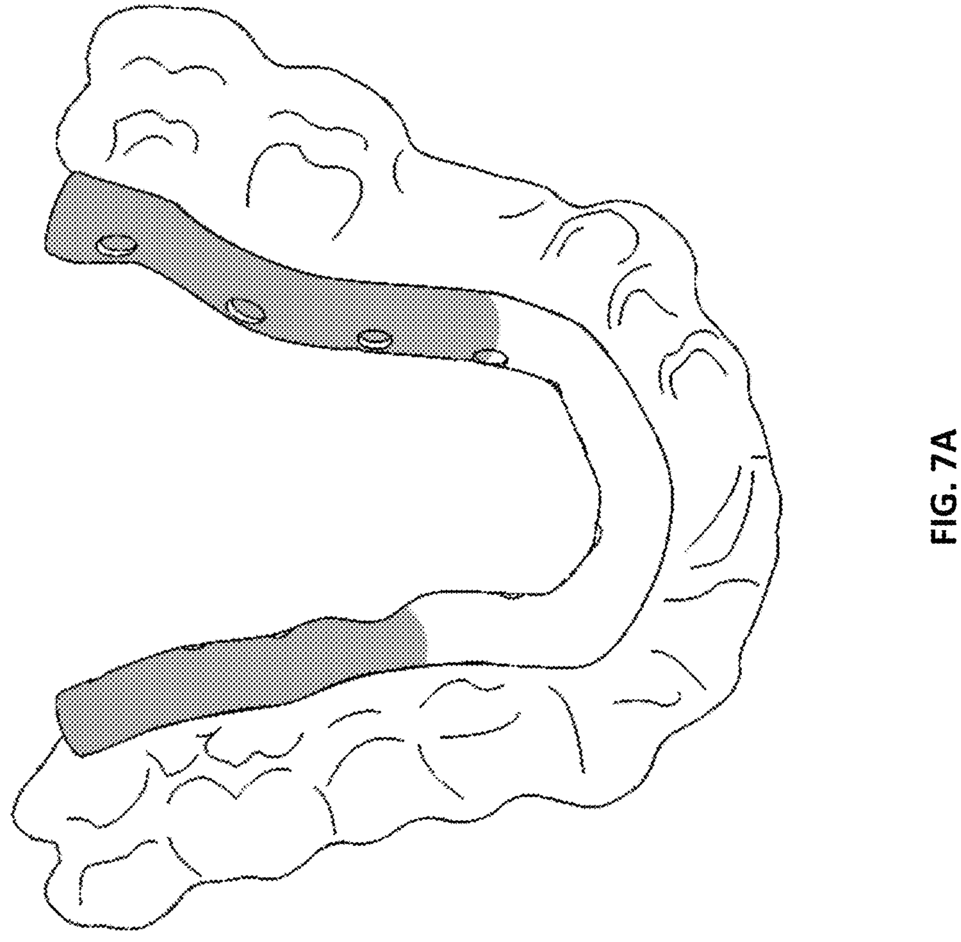
FIGS. 7A-B show bottom views of the appliance of FIG. 6 including product.
Figure 7B:
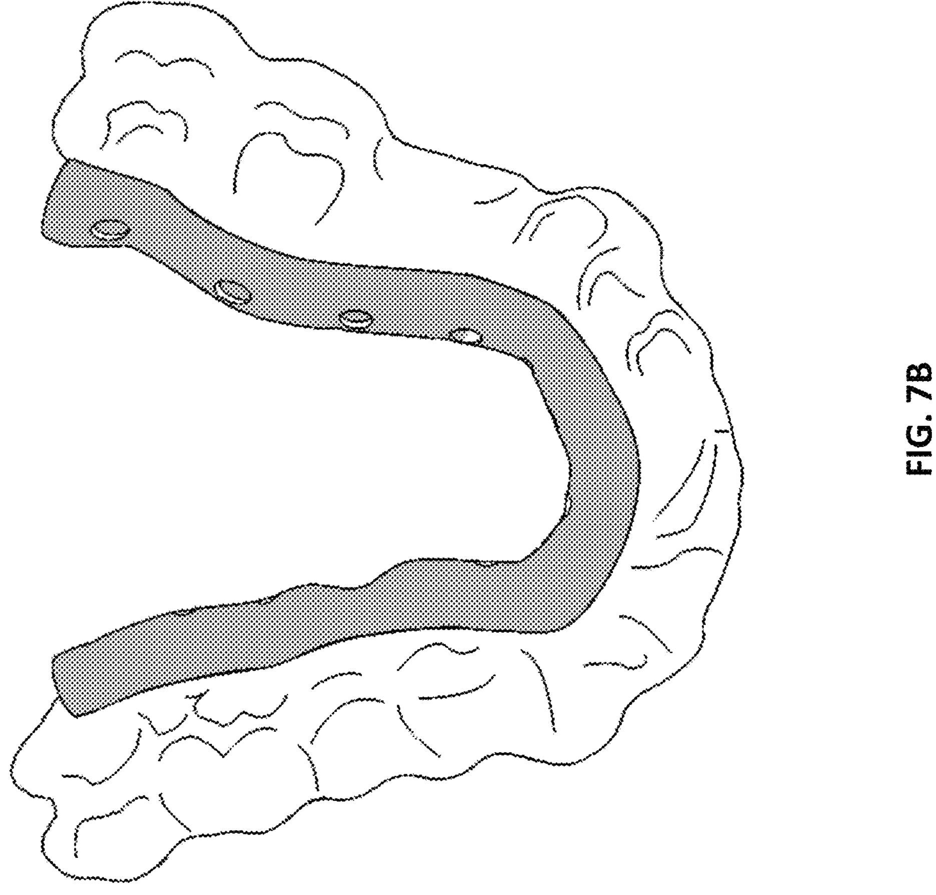
Figure 8A:
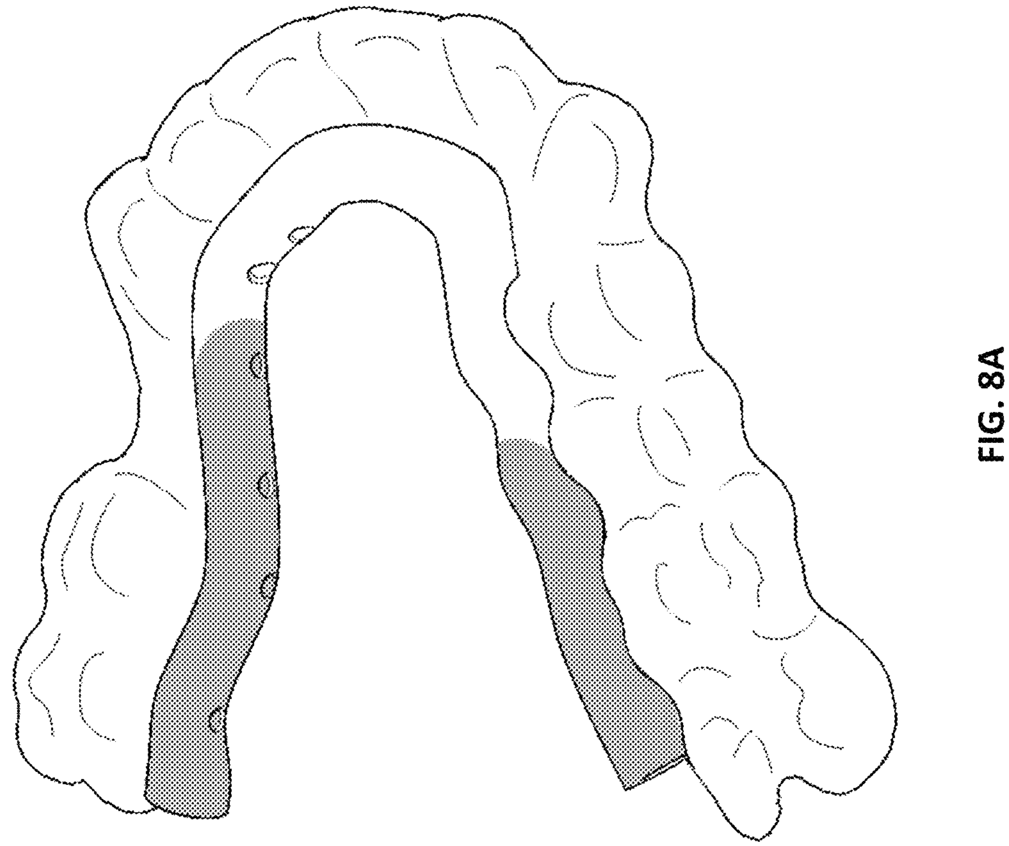
FIGS. 8A-B show perspective views of the appliance of FIG. 6 including product.
Figure 8B:
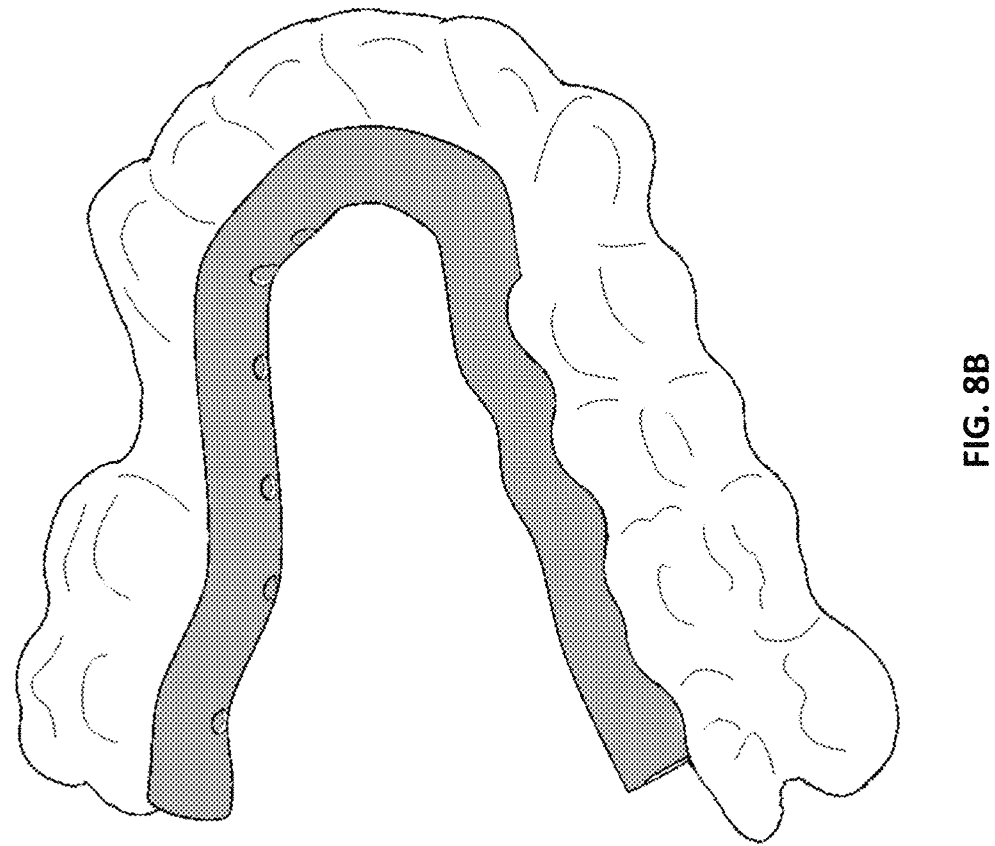
Figure 9A:
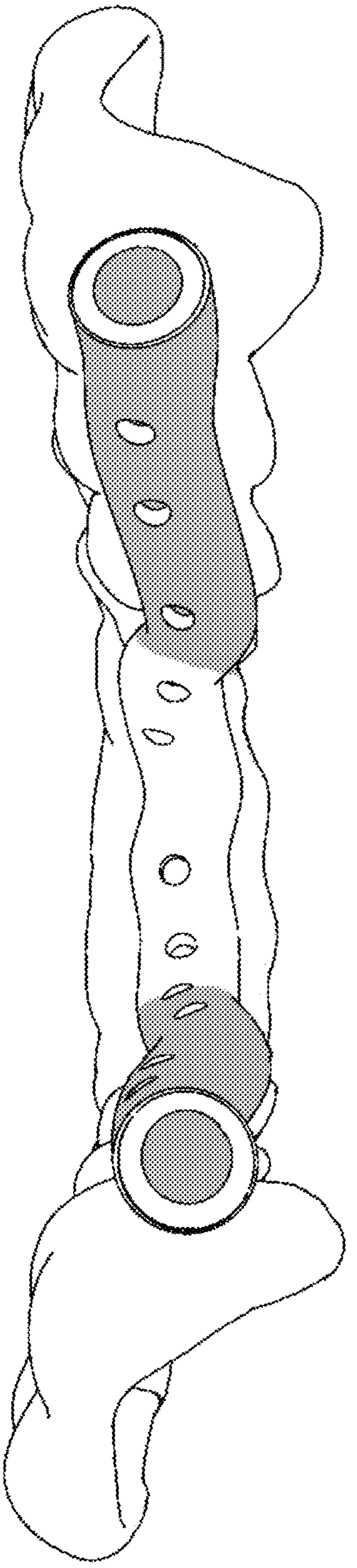
FIGS. 9A-B show back views of the appliance of FIG. 6 including product.
Figure 9B:
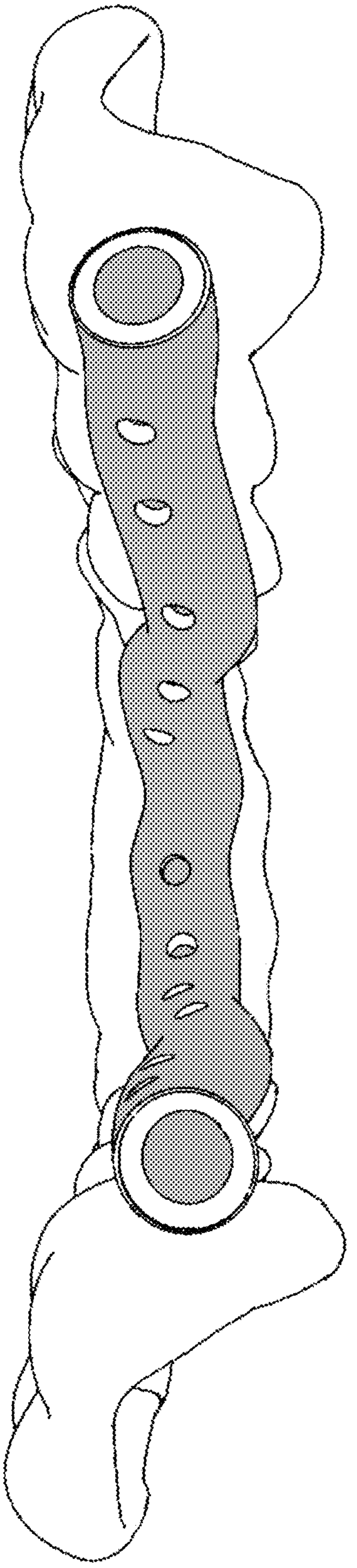

FIGS. 6-9B illustrate a system or device according to an embodiment of the present teachings. FIG. 6 shows a resulting appliance using a custom mold of a user's mouth. FIGS. 7A-9B show the appliance as partially filled and filled with an oral treatment material, which diffuses over several hours. The reservoirs in the appliance shown in FIGS. 7A, 8A, and 9A have been partially filled and FIGS. 7B, 8B, and 9B have been fully filled with the oral treatment material.

In some embodiments the device may be integrated partially or fully inside of the user's teeth in the case of false teeth, dentures, or other prosthetics. The dentures or false teeth may contain reservoirs or canals, in all or some of the false teeth or dentures, for product to be loaded into and diffused into the patient's mouth.

Figure 10:
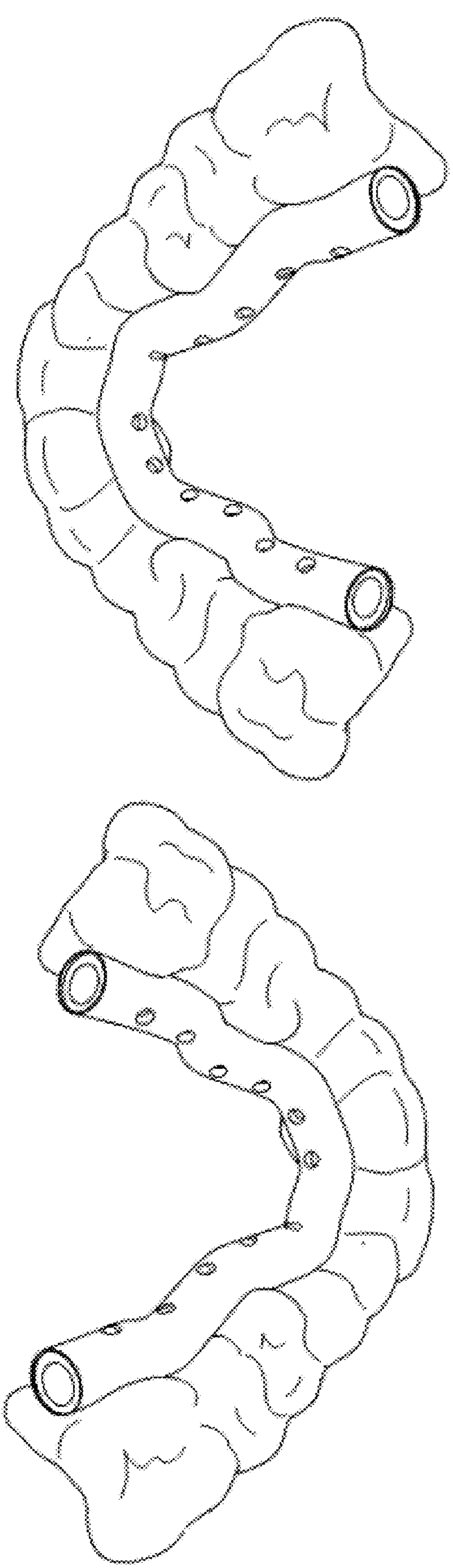
FIG. 10 shows different views of a customized mold insert (using a 3D dental model of a user's mouth) having a canal according to an embodiment of the present invention.
Figure 11:
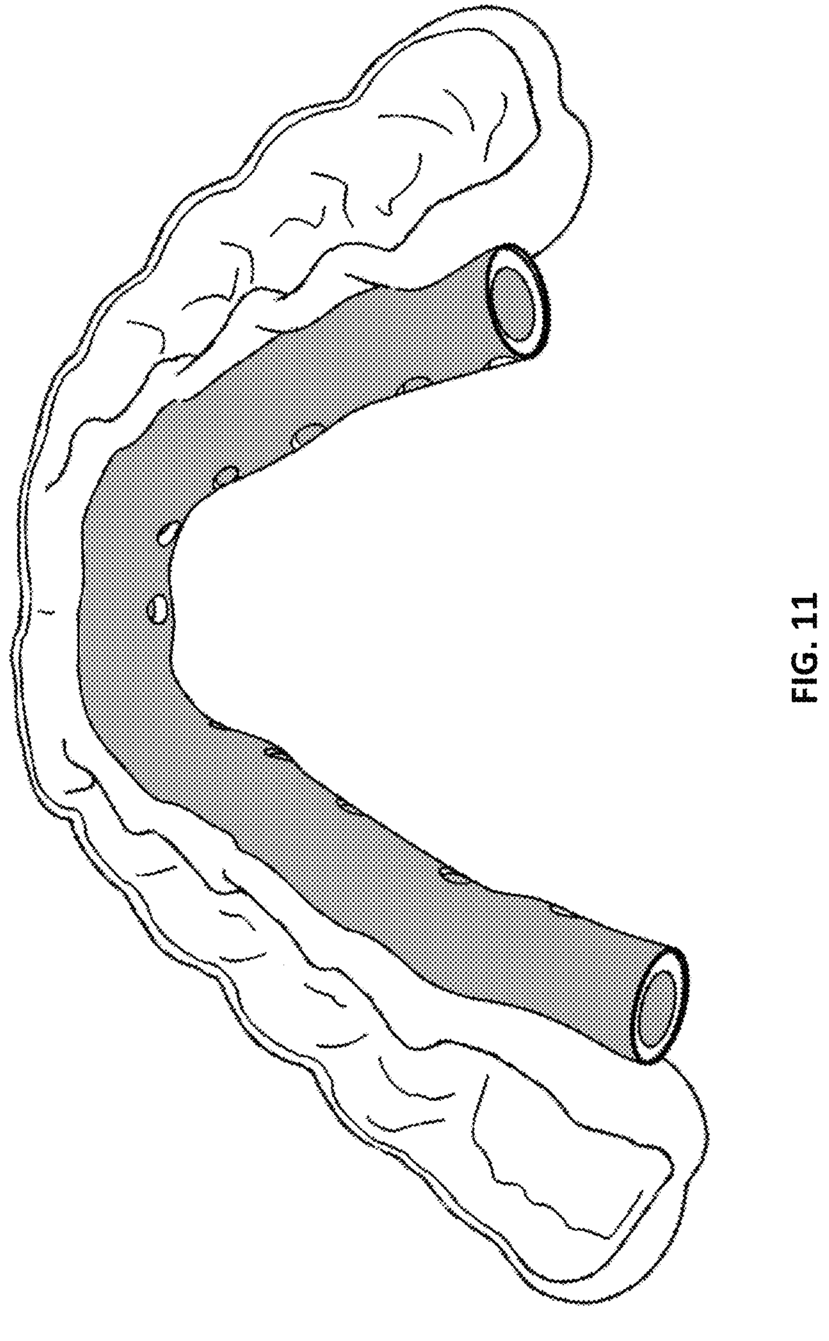
FIG. 11 and FIG. 12 show different views of the mold insert having a canal including product of FIG. 10.
Figure 12:
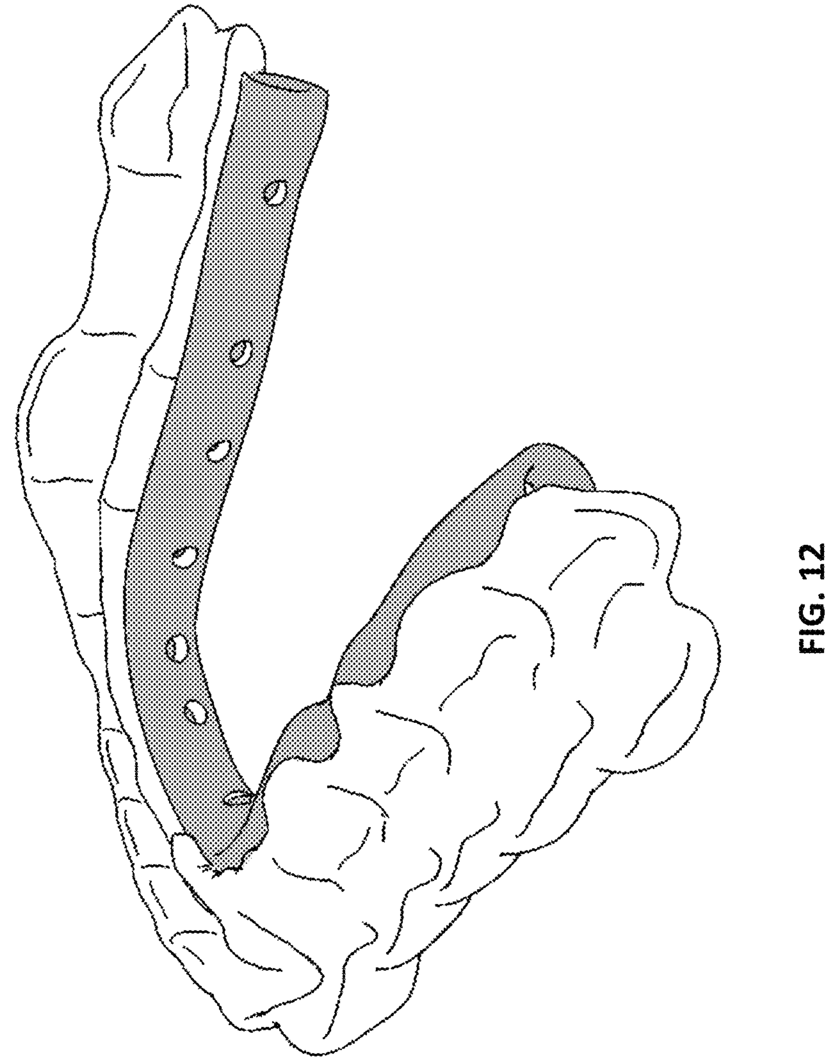

FIGS. 10-12 illustrate a system or device according to an embodiment of the present teachings. FIG. 10 shows different views of a mold insert having a canal. The mold insert is customized with teeth and gums based on the 3D dental model of a user's mouth. FIG. 10 shows the mold insert having the canal. Thus, the device shown here has two main components: the mouthpiece to hold the device in position, and the canal, which is the reservoir that holds the product. The canal in FIG. 10 has not been filled. FIGS. 11 and 12 shows different views of the mold insert customized with teeth and gums based on the 3D dental model of a user, and the mold insert having a canal filled with a product for oral treatment. The canals shown in FIGS. 11 and 12 are fully filled with the product for oral treatment. The product is injected into the canal, ready for treatment. There are multiple small holes in the canal, which allow the product to be loaded into the canal and slowly disperse while the patient is sleeping, thus hydrating the mouth throughout the night—without any choking hazards. This can be referred to as passive hydration.

Figure 13:
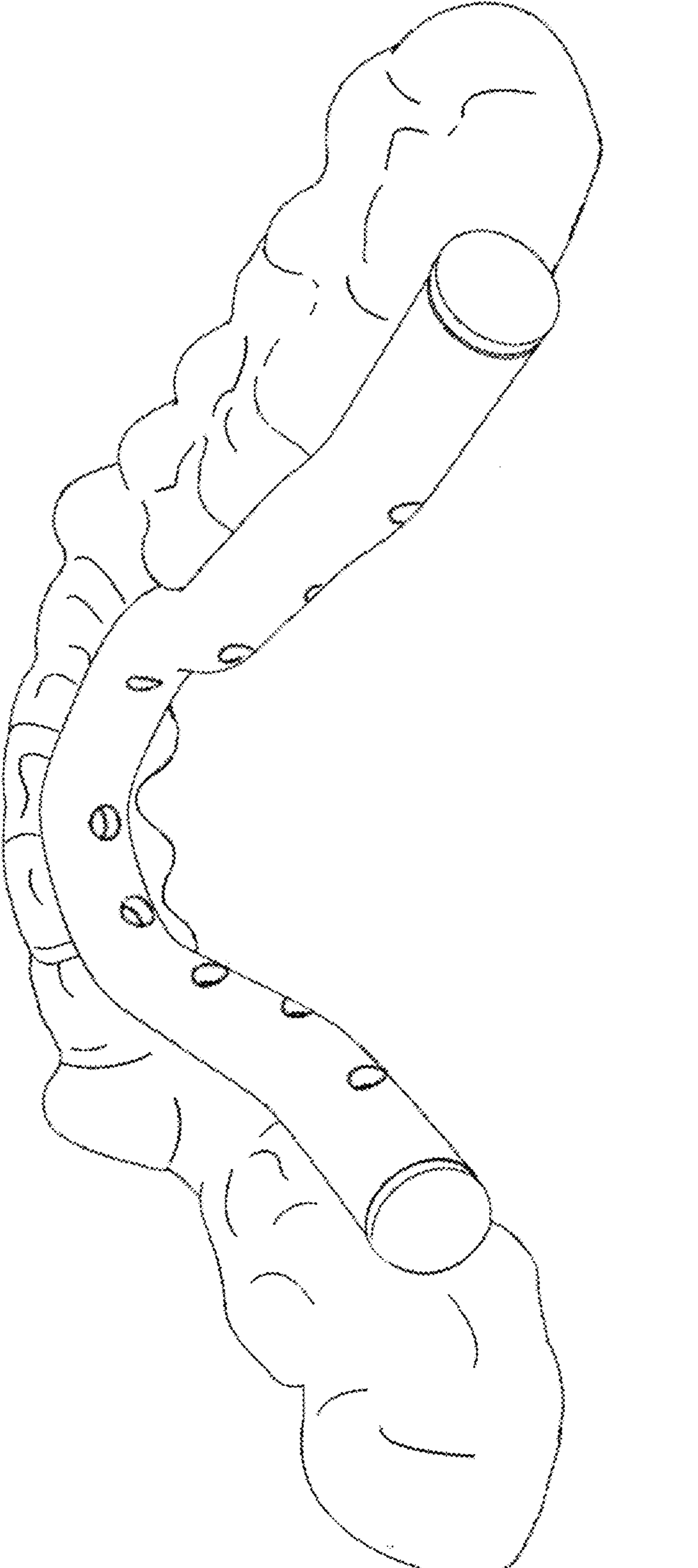
FIG. 13 shows a perspective view of the device with a canal, which is the reservoir that holds the product or other medication according to an embodiment of the present invention.
Figure 14:
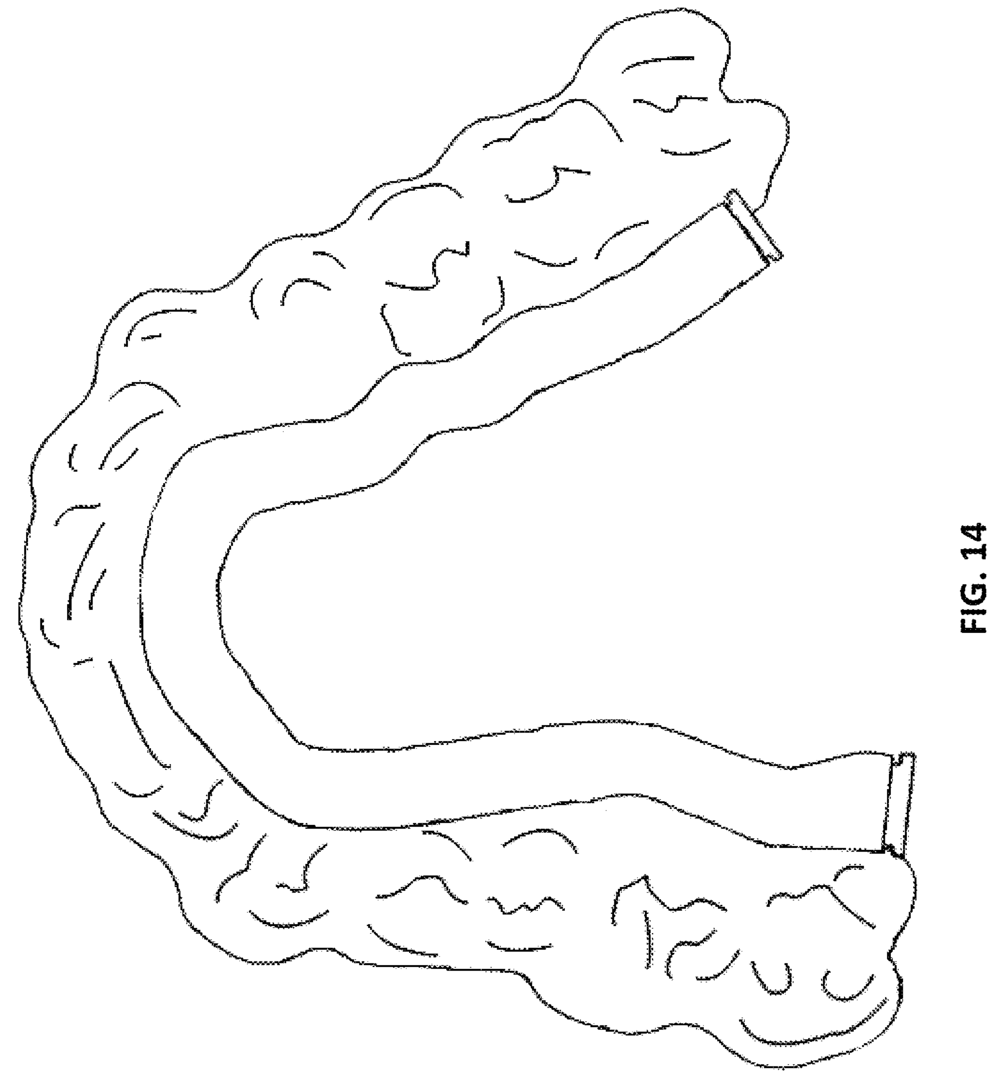
FIG. 14 shows a top view of FIG. 13.

FIGS. 13-14 illustrate a system or device according to an embodiment of the present teachings. FIG. 13 shows a perspective view of the device as the canal, which is the reservoir that holds the hydrating product, other medication, or product for diffusion. The canal is attached to an existing device such as an appliance or a mold insert and runs along the inside of the appliance, or the mold insert. In FIG. 13, the canal is glued to an upper appliance or an upper mold insert using UV-catalyzed biocompatible resin. The appliance or the mold insert may be thermoformed, or 3D mold printed, among other known dental appliance forming methods. The tips attached to the canal are used to enclose the hydrating product, other medication, or product for diffusion, in the canal and can be opened for refilling and cleaning of the canal. FIG. 14 shows a top view of FIG. 13. The canal may also be refilled using the small holes along the canal.

Figure 15:
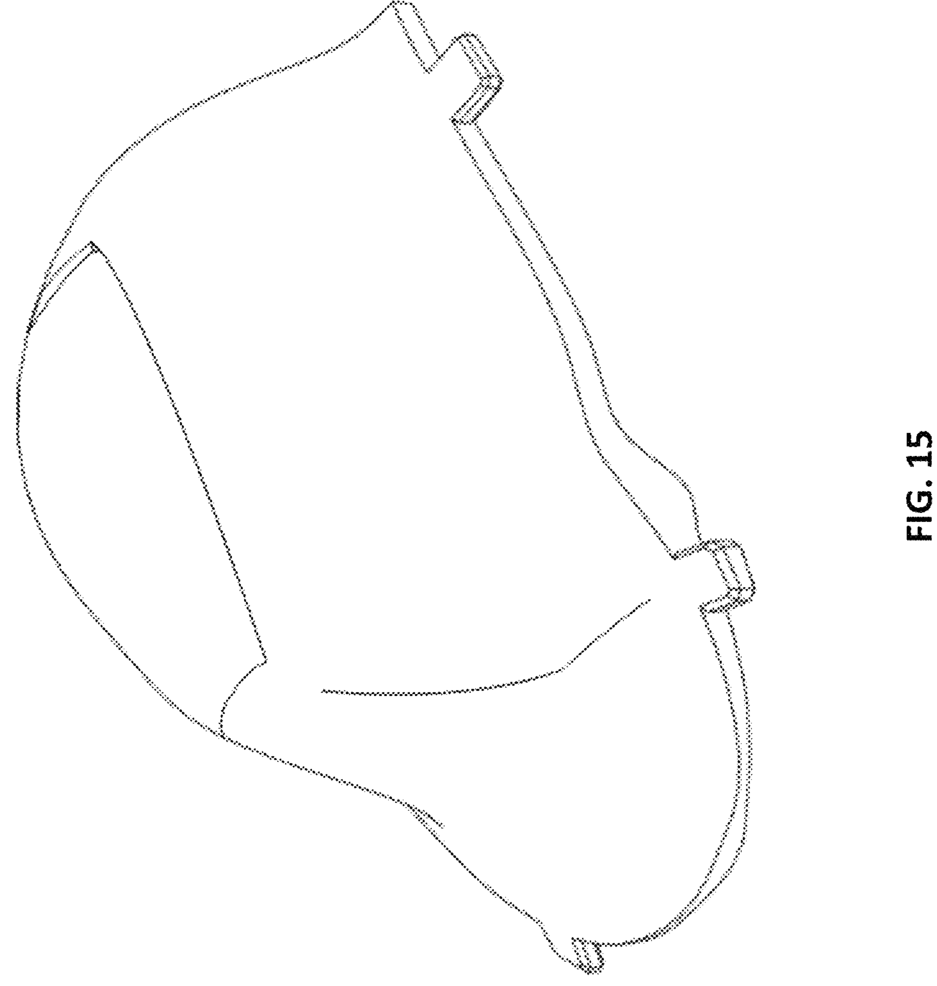
FIG. 15 shows a device having a full palate-covering plate having a reservoir space according to an embodiment of the present invention.
Figure 16:
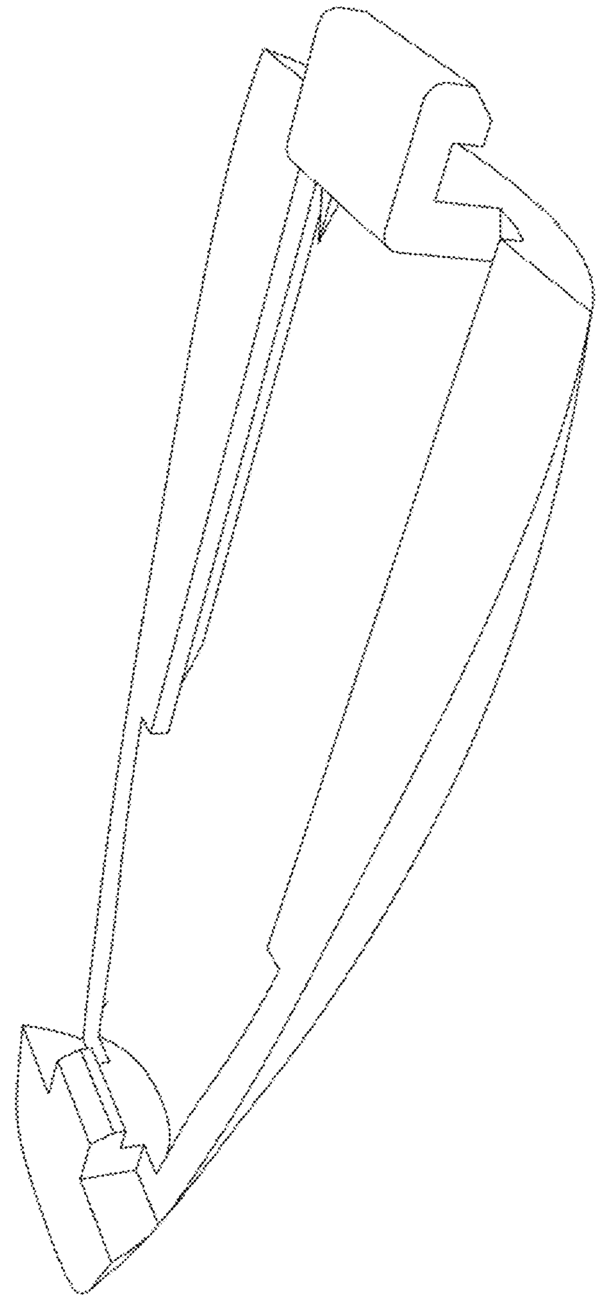
FIG. 16 shows the small compartment piece of the device of FIG. 15.
Figure 17:
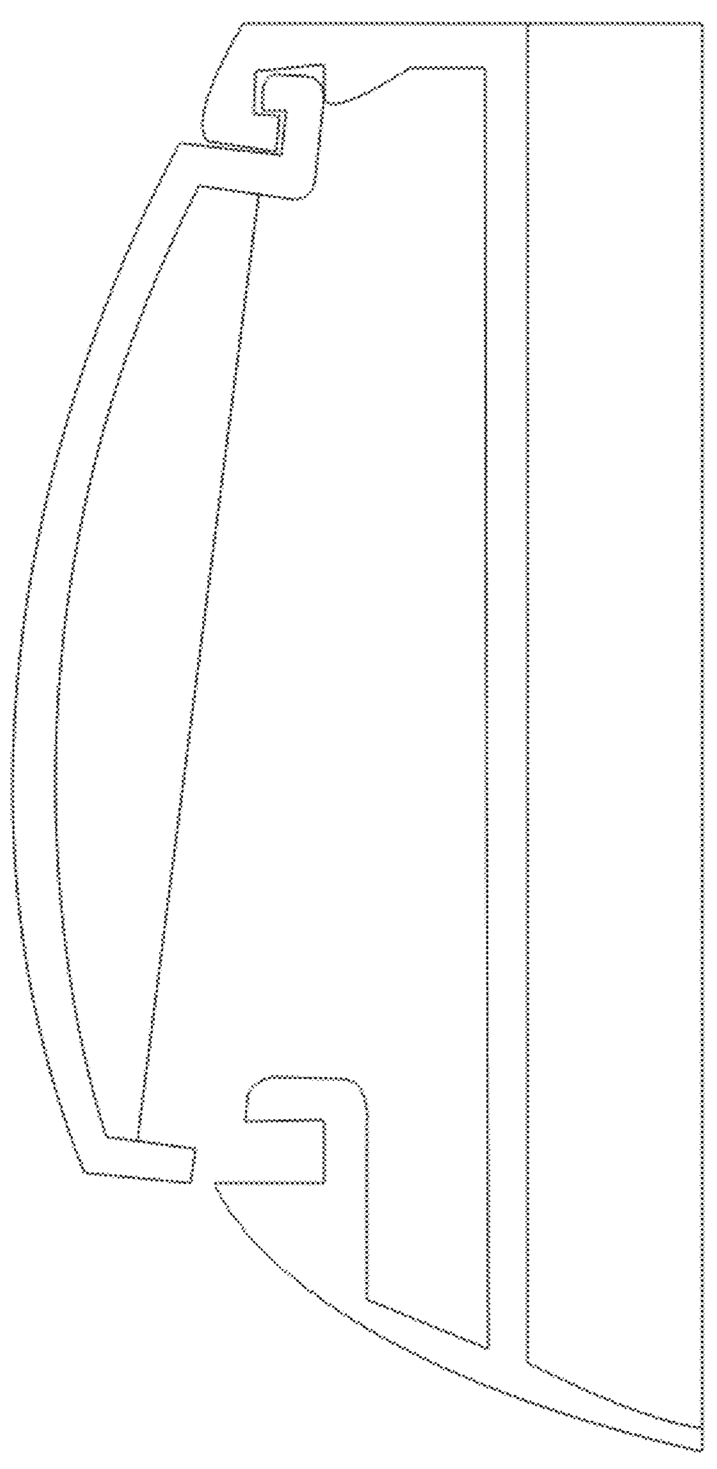
FIG. 17 shows the open/close mechanism of the device of FIG. 15.
Figure 18:
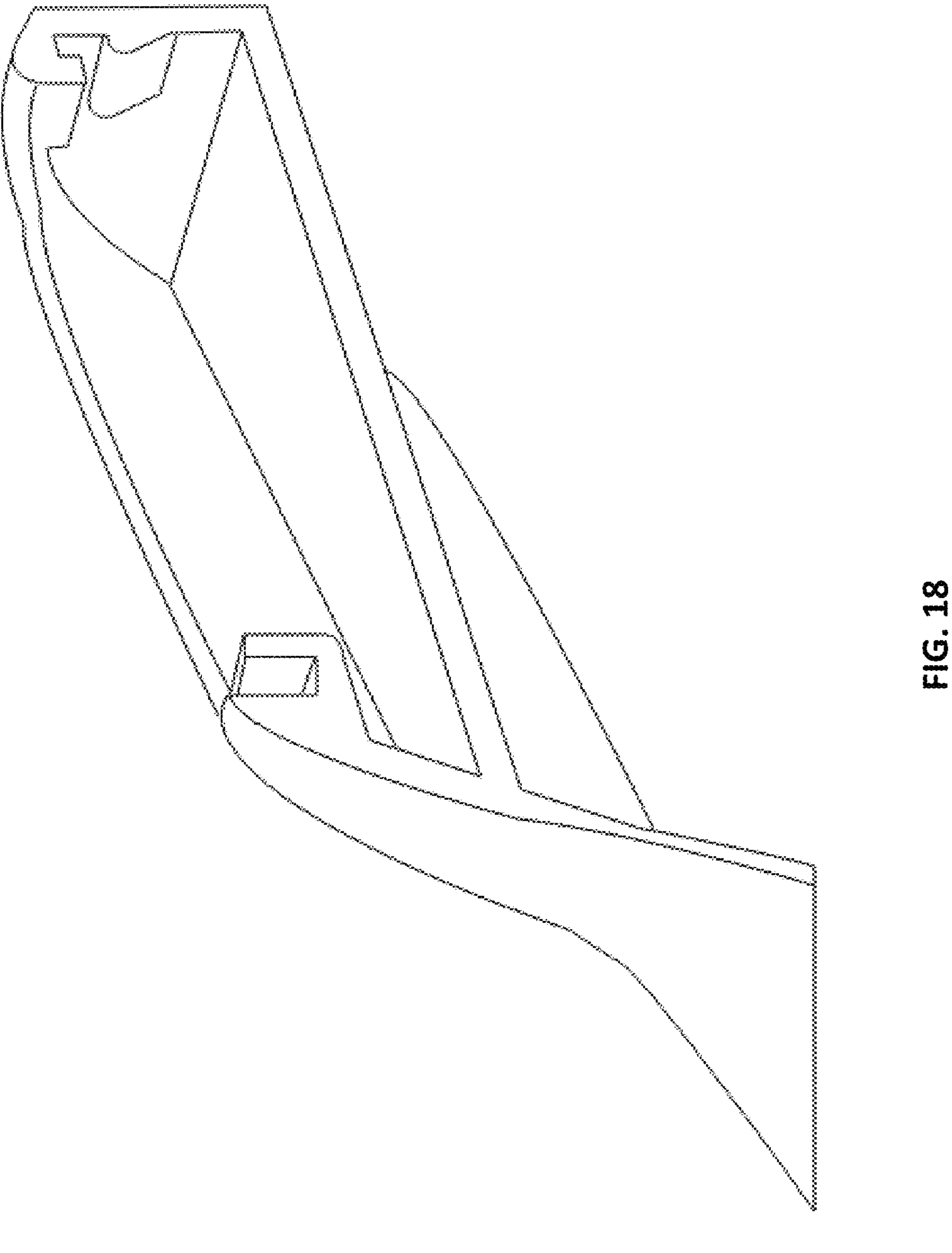
FIG. 18 shows a cross section of the area including the reservoir space in the palate-covering plate of the device of FIG. 15.

FIGS. 15-18 illustrate a system or device according to an embodiment of the present teachings. FIG. 15 shows a device having a full palate-covering plate having a reservoir space. A small compartment piece is placed on the plate at the center area, which covers the reservoir space and creates a reservoir for containing and delivering the oral treatment products. The small compartment piece can be closed securely with a latch and press clip from the top and can be easily opened for cleaning. This design allows introduction of a foam pad, cartridge, or mesh infused with a client's proprietary product, or commercially available product and is compatible with a straight Hawley type appliance which covers the user's full palate. FIG. 16 shows the small compartment piece of the device of FIG. 15. FIG. 17 shows the open/close mechanism of the device of FIG. 15. FIG. 18 shows a cross section of the area including the reservoir space in the palate-covering plate of the device of FIG. 15. It is noted that an appliance is not shown in FIG. 15, but the device of FIG. 15 has the connecting mechanism that provides the attachment to the appliance, and thus the device may be used with or without an appliance. The device may have holes along the surface proximal and/or distal to the palate. The holes may be directly connected to the reservoir or may be connected to channels connected to the reservoir. Product in the reservoir may flow through the holes into the patient's mouth or may be moved through channels or passages to distribute the product throughout the user's mouth and may be directed in varying concentrations to different locations in the user's mouth. The holes may be circular holes, slits, meshes, or other opening to allow the diffusion of product from the reservoir.

Figure 19:
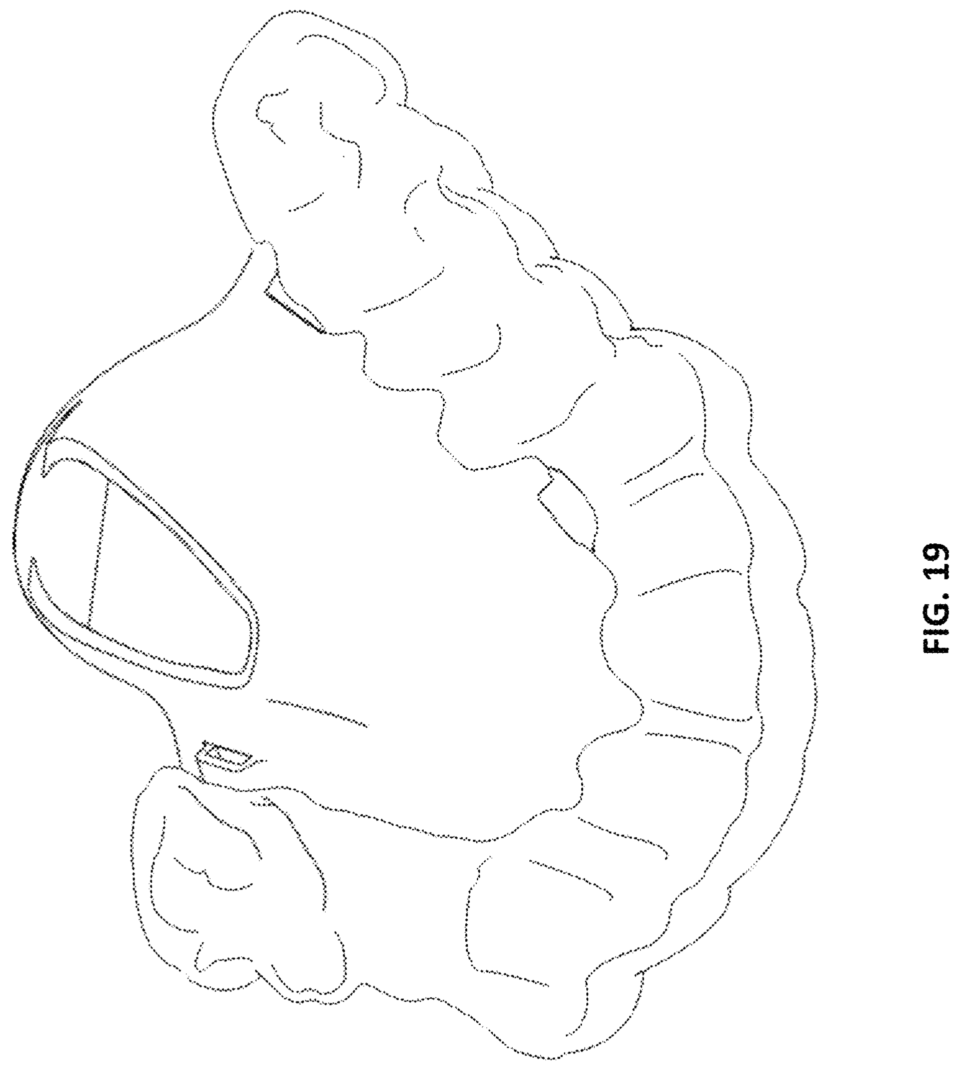
FIG. 19 shows a device having an appliance with a full palate-covering plate having a reservoir space according to an embodiment of the present invention.
Figure 20:
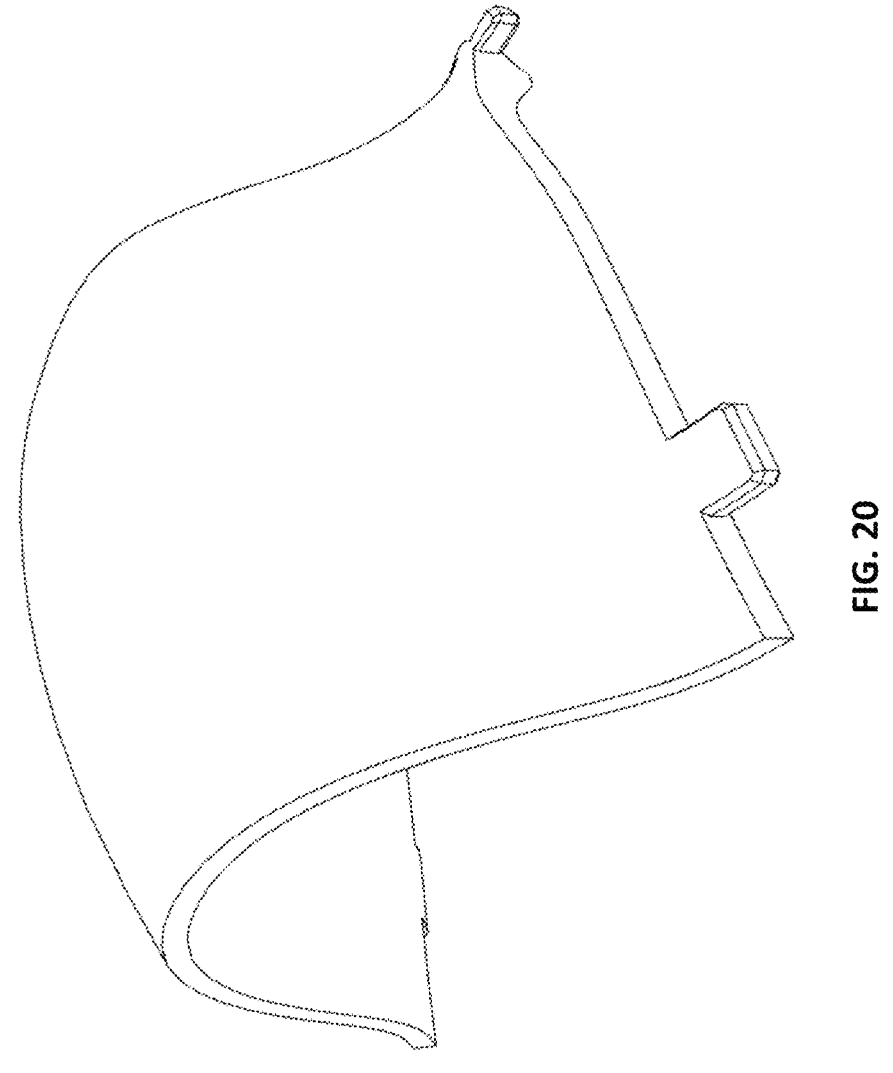
FIG. 20 shows an upper piece to be used with the device of FIG. 19.
Figure 21:
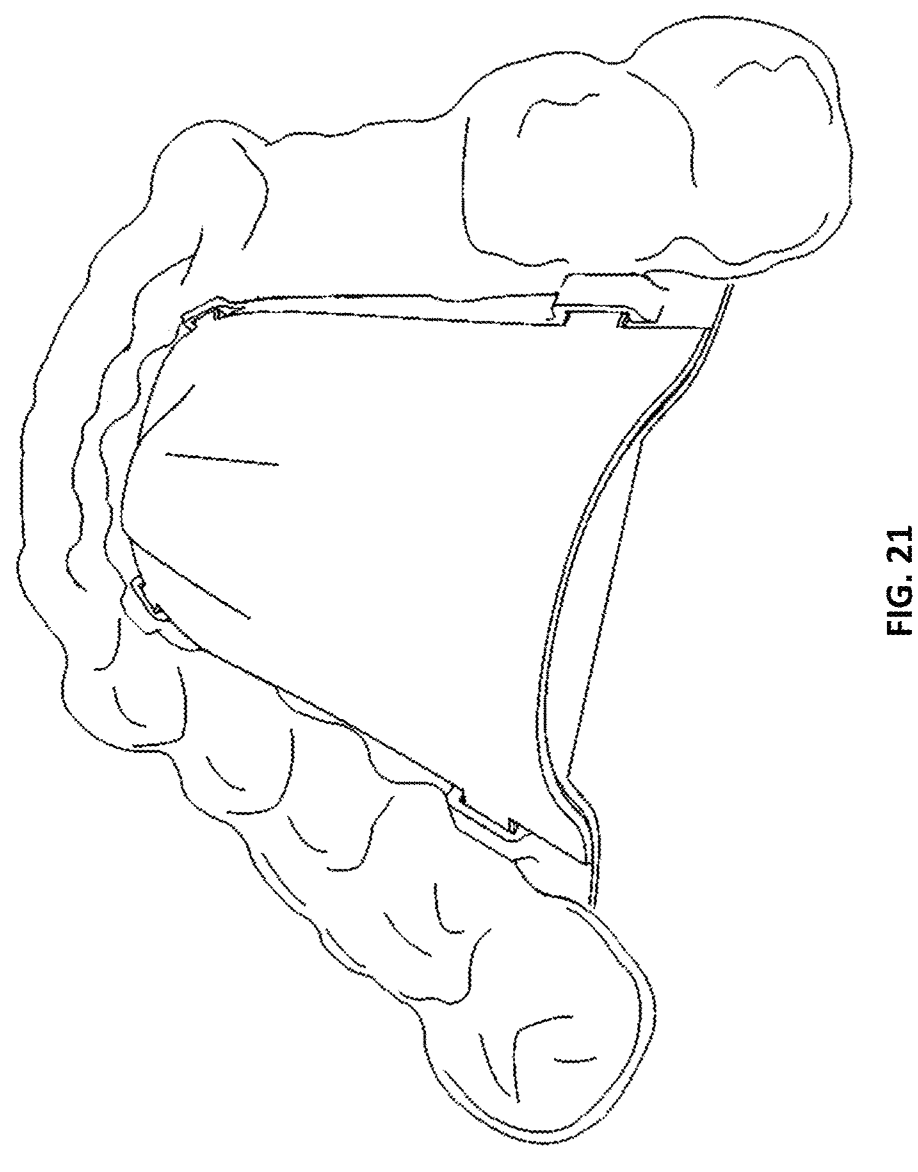
FIG. 21 shows an assembly of pieces of FIGS. 19 and 20 to form a reservoir.
Figure 22:
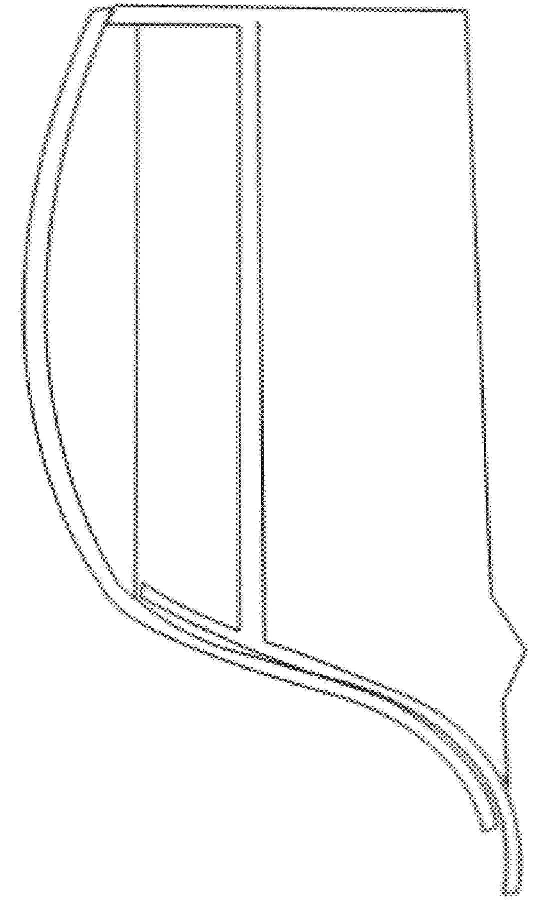
FIG. 22 shows a cross section of the area including the reservoir space in the palate-covering plate of the device of FIG. 21.

FIGS. 19-22 illustrate a system or device according to an embodiment of the present teachings. FIG. 19 shows a device having an appliance with a full palate-covering plate having a reservoir space. FIG. 20 shows an upper piece, which is slightly larger than the palate-covering plate and will slide over the palate-covering plate and be latched to the palate-covering plate to form a reservoir as shown in FIG. 21. This design may allow for a cartridge, foam pad, or mesh, containing or infused with an oral treatment, proprietary product, or commercially available product to be enclosed and may prevent the material from escaping. FIG. 22 shows a cross section of the area including the reservoir space in the palate-covering plate of the device of FIG. 21. It is noted that an appliance is shown in FIG. 19, but the device in FIG. 19 has the connecting mechanism that provide the attachment to the appliance, and thus the device may be used with or without an appliance. The device depicted in FIGS. 19-22 may have similar holes, channels, or passages, to those described above in the device depicted by FIGS. 15-18, on the reservoir surface to allow for the diffusion of product.

Figure 23:
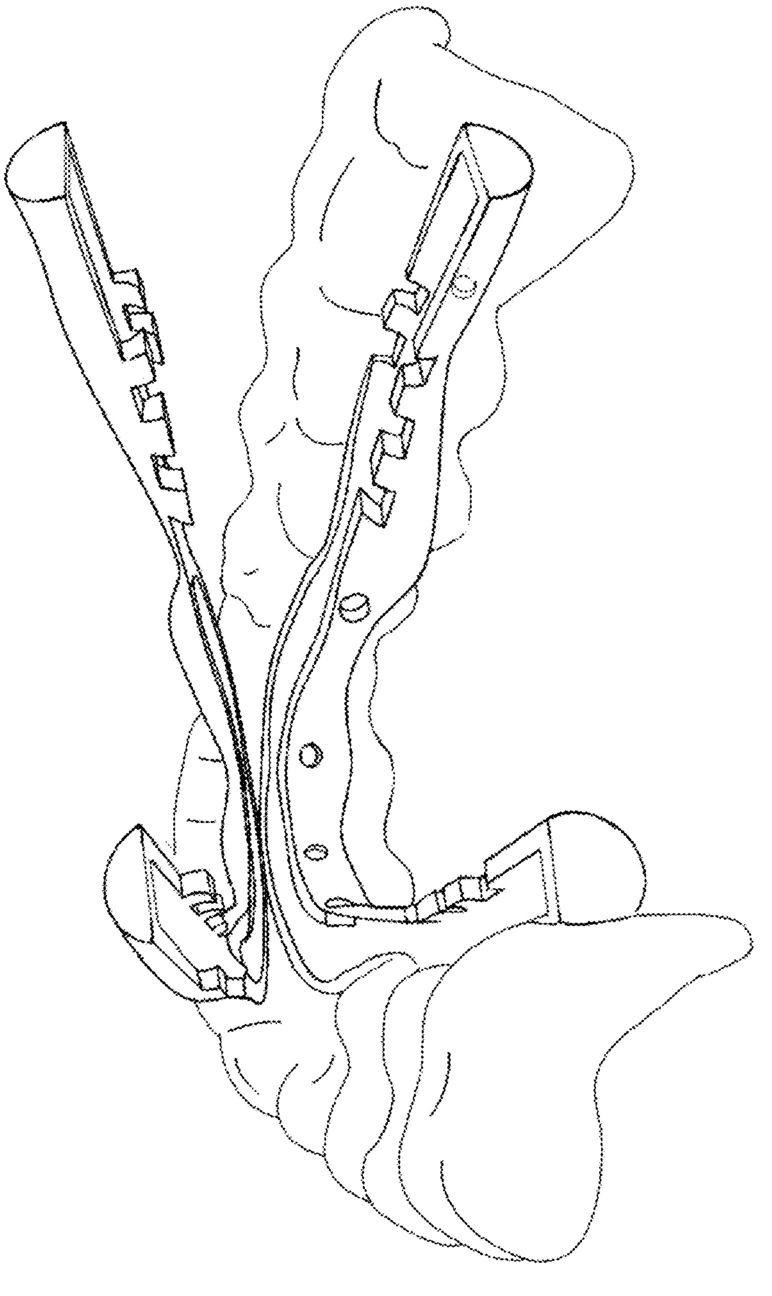
FIG. 23 shows a perspective view of the device with a clamshell canal, which is the reservoir that holds the product or other medication according to an embodiment of the present invention.
Figure 24:
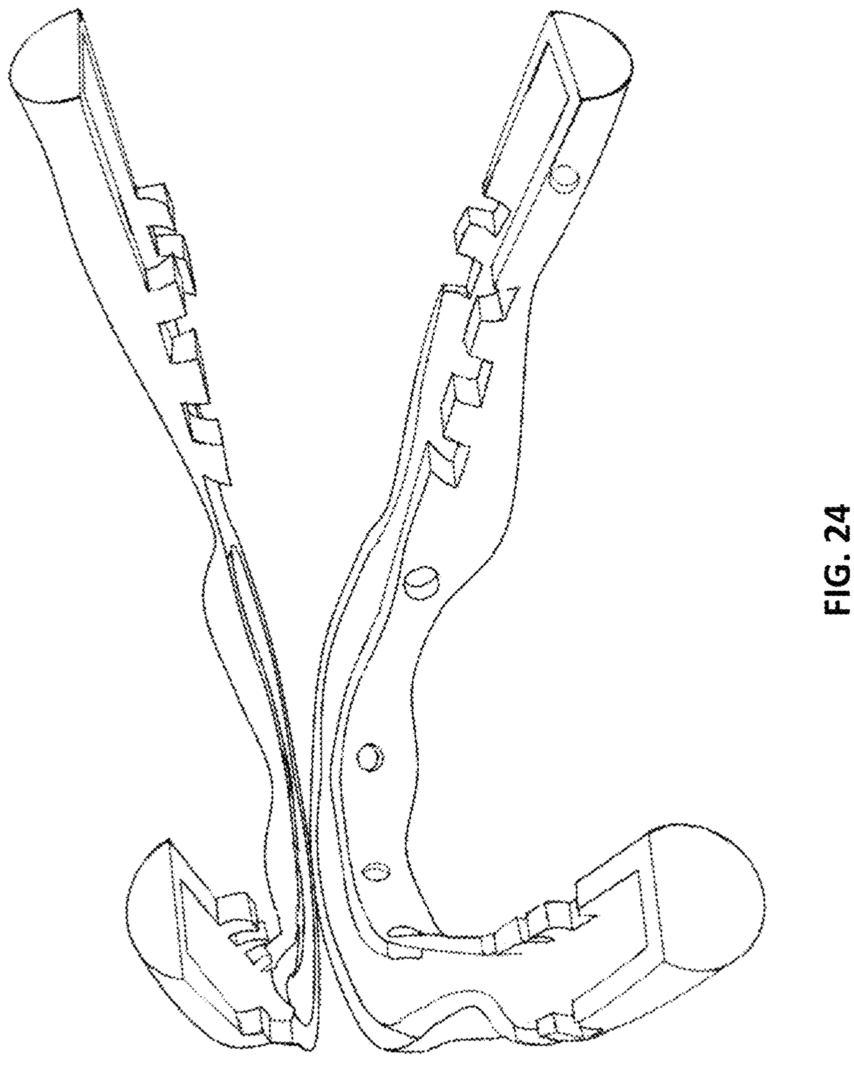
FIG. 24 shows a perspective view of a clamshell canal, which is the reservoir that holds the product or other medication according to an embodiment of the present invention.
Figure 25:
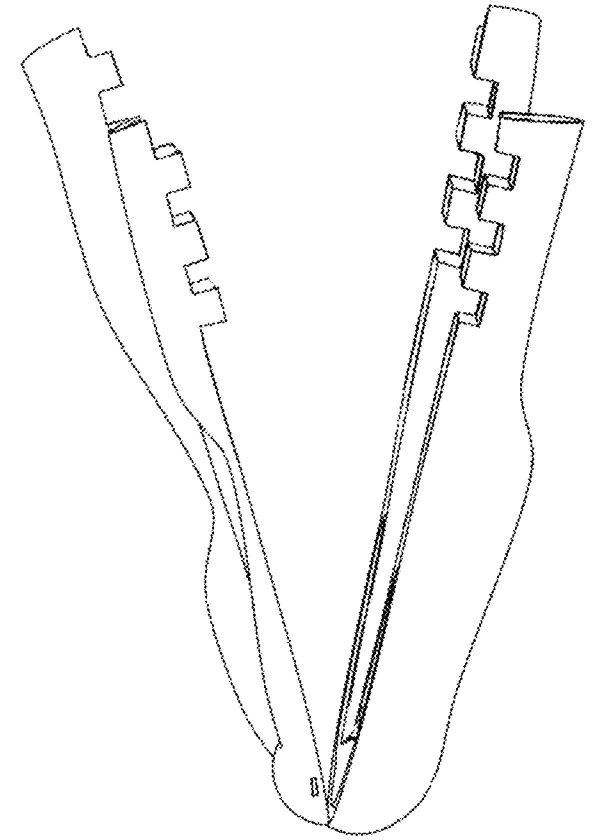
FIG. 25 shows a side view of FIG. 24.

FIG. 23 illustrates a system or device according to an embodiment of the present teachings. FIG. 23 shows a device comprised of an external appliance and an internal two-part clamshell reservoir. The appliance may be a mold insert custom fitted to the user's mouth. The reservoir may have a canal shape. The reservoir may be split horizontally into an upper part and a lower part. The lower part may be permanently printed, molded, affixed, or otherwise secured to the appliance and may be larger than the upper part allowing for a larger surface area to bond to the appliance. The upper and lower parts may be separate pieces or may be connected by a hinge or other movable connection. The reservoir may be opened allowing the reservoir to be cleaned or loaded with product. The reservoir may have one or more openings to allow the loaded product to be diffused into the user's mouth. The reservoir may also be refilled via the one or more openings. The reservoir may have a locking mechanism to hold the upper and lower part of the reservoir together and may be releasable. The locking mechanism may be teeth like structures or crenellated steps along the edges that clamp or snap together. The reservoir may feature one or more sets of locking mechanisms in one or more locations along the edge of the reservoir. FIGS. 24-25 show alternate views of the reservoir detached from the appliance. FIG. 25 shows a male tab at the front of the reservoir. FIG. 26 illustrates the male-female closure tabs at the front of the reservoir and inside the appliance. In one embodiment the reservoir may be detachable from the appliance.

Figure 27:
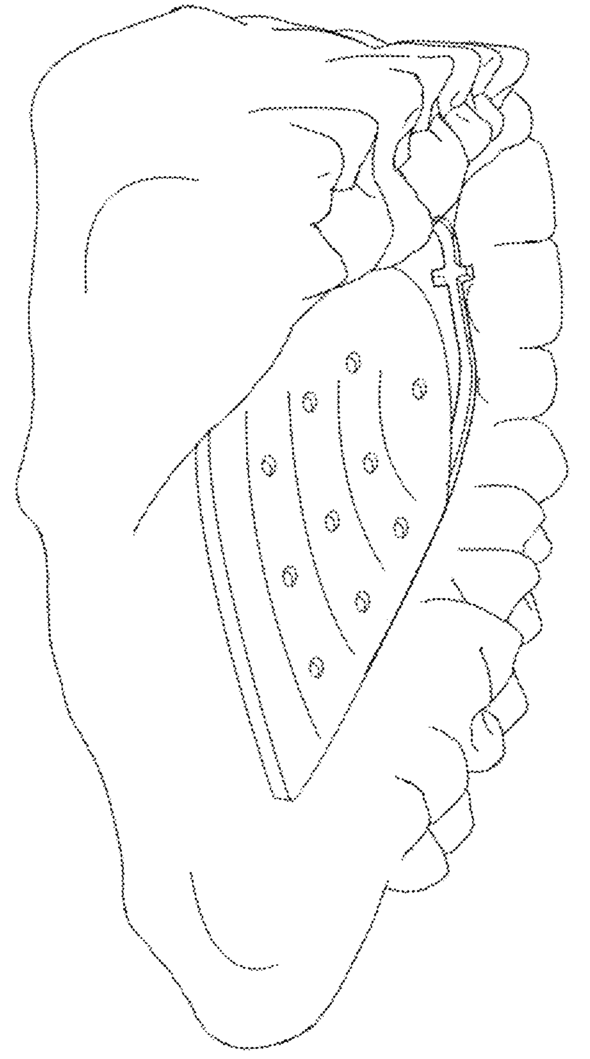
FIG. 27 shows a perspective view of a cartridge system inserted below the appliance palate according to one embodiment of the present teachings.

FIG. 27 illustrates a system or device according to an embodiment of the present teachings. FIG. 27 shows a device comprised of a prosthesis and an insert. The prosthesis may be full or partial dentures, false teeth, or other oral prosthesis. The prosthesis may be connected to the patient's gums, jaw, or teeth and may be held in place by friction, adhesive and/or vacuum pressure. The prosthesis may also be placed over or integrated between a patient's existing teeth. The insert may be a cartridge, foam, mesh, or other oral insert, containing product for oral diffusion. The insert may be positioned below the palate of the prothesis having holes or other openings for oral diffusion. The insert may attach to the prothesis via a groove, male/female connection, adhesive, or other removable attachment. FIG. 27 is similar to the embodiments depicted in FIGS. 1 and 2 adapted for use with dentures or other prothesis.

Figure 28:
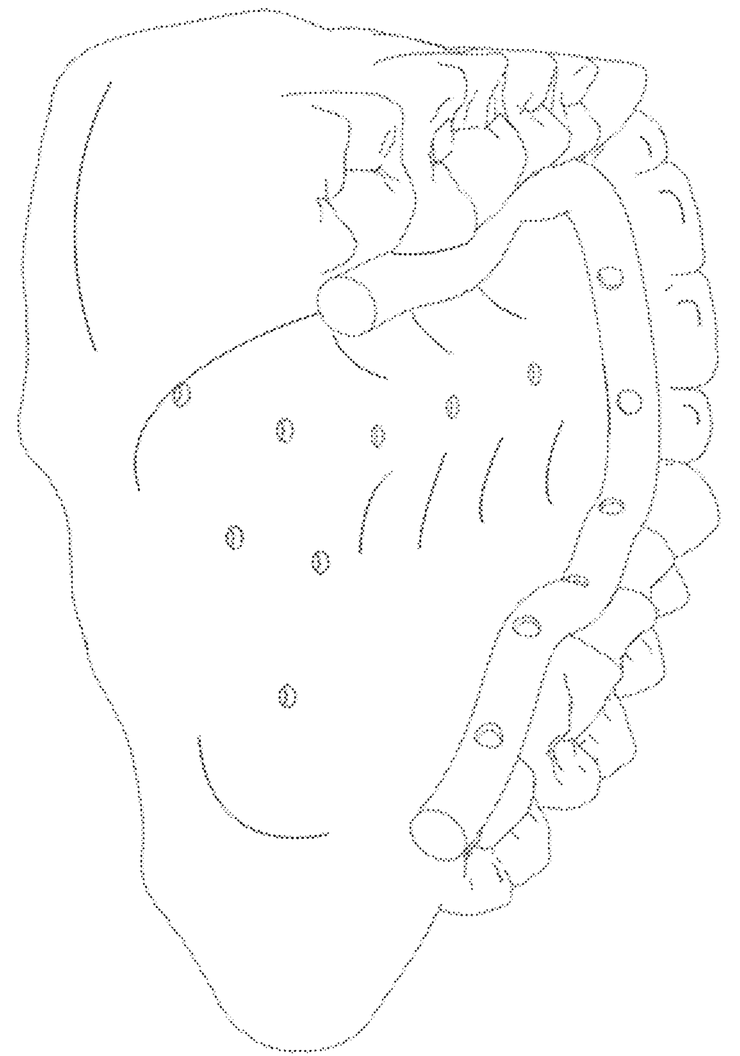
FIG. 28 shows a perspective view of a canal reservoir along the appliance and a reservoir tank inside of the appliance palate according to one embodiment of the present teachings.

FIG. 28 illustrates a system or device according to an embodiment of the present teachings. FIG. 28 shows a device comprised of a prosthesis, a canal and a reservoir. The prosthesis may be full or partial dentures, false teeth, or other oral prosthesis. The prosthesis may connect to the patient's gums, jaw, or teeth and may be held in place by friction, adhesive and/or vacuum pressure. The prosthesis may also be placed over or integrated between a patient's existing teeth. The reservoir and the canal may be filled with product for oral diffusion and may be filled with the same or different products. The palate of the prosthesis may contain the reservoir. The palate of the prothesis may have holes or other openings for the product in reservoir to diffuse into the patient's mouth. The top of the prosthesis may also have holes or other openings to allow product to be diffused above the prosthesis. The reservoir may be similar to the embodiments of the reservoir depicted in FIGS. 15-22. The canal may be positioned along the teeth of the prothesis and may have holes or other openings to diffuse product. The canal may be permanently or removable affied to the prosthesis. The canal may be similar to the embodiments of the canal depicted in FIGS. 6-14 or similar to the embodiments of the canal depicted in FIGS. 23-26. In another embodiment the device may have the prosthesis and reservoir as described above without the canal. In a further embodiment the device may have the prosthesis and canal described above without the reservoir.

Figure 29:
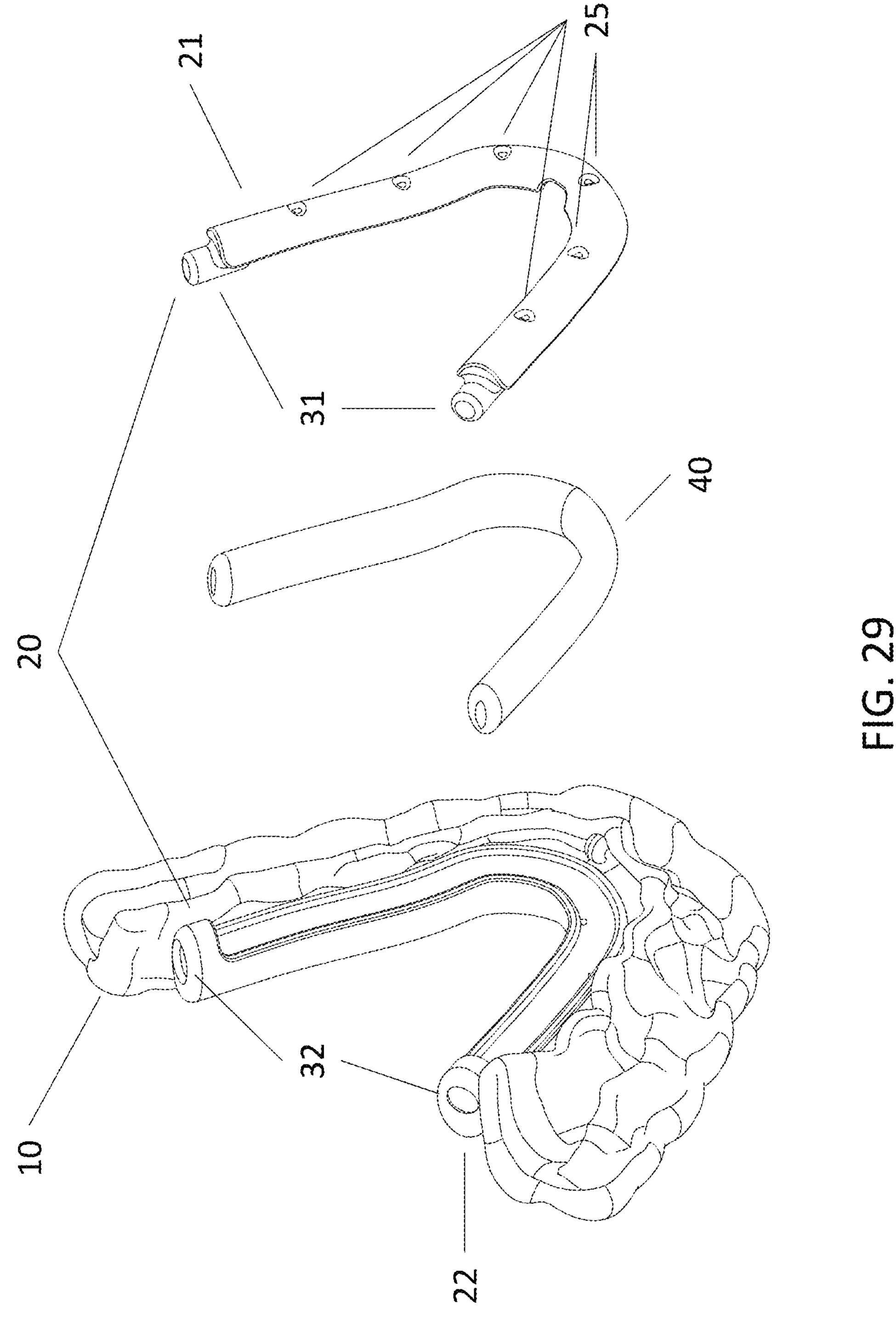
FIG. 29 shows an exploded perspective view of one embodiment of the present teachings wherein an appliance has a reservoir comprising an upper piece and a lower piece. A product to be placed within the reservoir is also visible.
Figure 30:
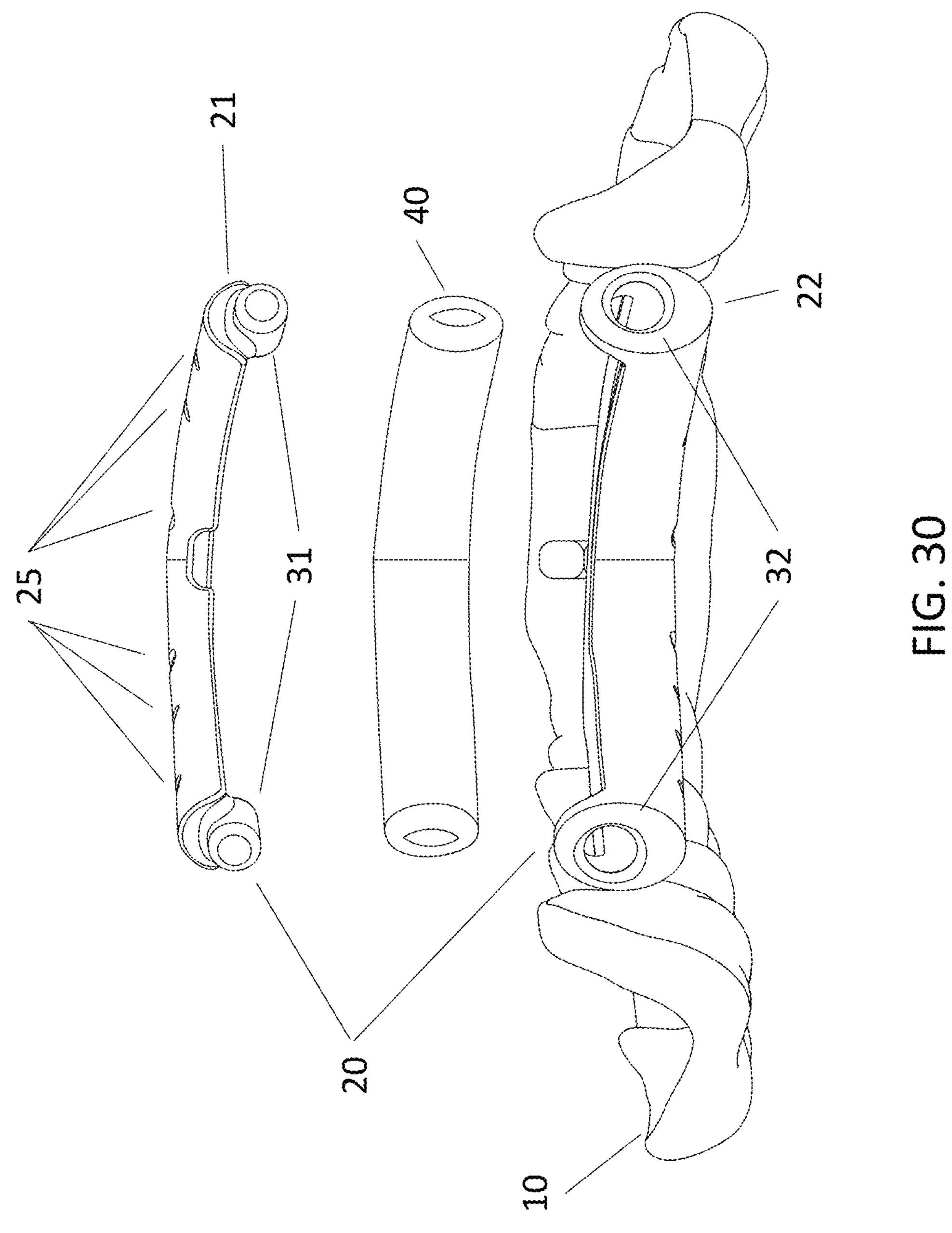
FIG. 30 shows a back view of the embodiment of FIG. 29.

FIGS. 29 and 30 illustrate a system according to an embodiment of the present teachings wherein an appliance 10 having a reservoir 20 comprising an upper piece 21 and a lower piece 22 is shown. The reservoir 20, and accordingly its upper piece 21 and lower piece 22, may be in any shape, including without limitation, an arch, a horseshoe, or the anatomical shape of a user's oral cavity. A product 40 in the form of a disposable cartridge is also shown The appliance 10 shown may be of any form herein disclosed, as well as other forms known by persons skilled in the art. The appliance 10 may have a body, as seen in FIGS. 29 and 30, which is configured or configurable to fit over a user's teeth, including over a user's maxillary teeth. The reservoir 20 shown in FIGS. 29 and 30 is substantially in the form of an oval, though other forms, including circular, are contemplated. Although the lower piece of the reservoir shown in FIG. 29 is attached to the appliance 10, it is contemplated that the lower piece 22 of the reservoir may be removed. Removal of the lower piece 22 may result in greater ease of cleaning or of inserting product. The product 40 depicted in FIGS. 29 and 30 may be any form or combination of forms contemplated herein, including but not limited to, medications, hydrating products, and breath fresheners. Also visible in FIGS. 29 and 30 are a plurality of ports 25 on the upper piece 21 of the reservoir 20 for delivering the product into the user's mouth. The ports 25 may be in any form herein disclosed, including but not limited to holes, slits, or channels. Further, any number of ports 25 and any size of ports 25 are contemplated, as is an upper piece 21 of the reservoir 20 having no ports.

FIGS. 29 and 30 show one embodiment of the peg-and-hole system for securing the upper piece 21 of the reservoir 20 to the lower piece 22 of the reservoir contemplated herein. The peg-and-hole system depicted in FIGS. 29 and 30 is accomplished wherein the upper piece 21 of the reservoir 20 contains the "pegs" 31, which are seen at each end of the upper piece, and the lower piece 22 of the reservoir contains the "holes" 32, which are seen at each end of the lower piece 22. The peg-and-hole system seen in FIGS. 29 and 30 is such that the pegs 31 are insertable into the holes 32 to provide a secure attachment of the upper piece 21 to the lower piece 22. While the peg-and-hole system is in use (i.e., when the pegs 31 are inserted into the holes 32), a surface at the edges of the pegs 31 may be flush with a surface at the edges of the holes 32. Further, it is herein contemplated that the pegs 31 may be insertable into the holes 32 to create a friction fit, whereby the peg is slightly larger than the hole. It is contemplated that the pegs 31 and holes 32 of the peg-and-hole system are placed at opposite ends of the reservoir 20, with one peg 31 and one hole 32 per end. Each piece 21, 22 of the reservoir 20 is contemplated to have at least two ends. It is also contemplated that the peg-and-hole securing system may be accomplished where the lower piece 22 of the reservoir 20 contains the pegs 31 and the upper piece 21 of the reservoir 20 contains the holes 32. Although the peg-and-hole system depicted in FIGS. 29 and 30 utilizes pegs 31 and holes 32 that have round cross-sectional shapes, other cross-sectional shapes are within the scope of the present teachings, including without limitation, ovals, ellipses, and parallelograms. The peg-and-hole system is not limited to any length, form, or material. Further, the present teachings contemplate a peg-and-hole system having any number of pegs 31 and/or holes 32. Multiple peg-and-hole systems may be present in an invention according to the present teachings. Further referring to FIGS. 29 and 30, the connection between a peg 31 and a hole 32 may form a sufficient seal so as to prevent the egress, or leakage, of a product 40 during use of the invention.

Figure 31:
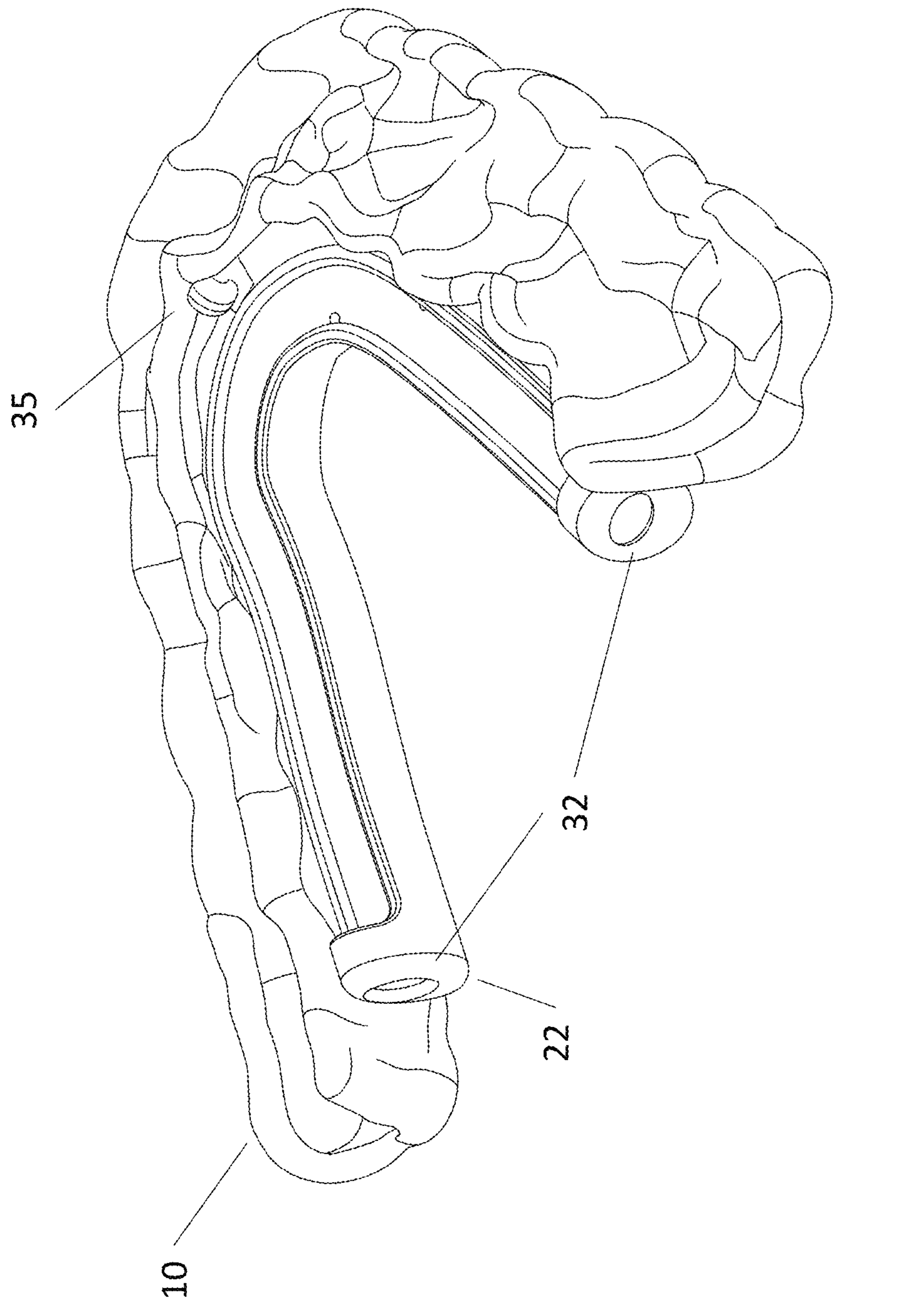
FIG. 31 shows a perspective view of the embodiment of FIG. 29, wherein the appliance is connected to the lower piece of the reservoir.
Figure 32:
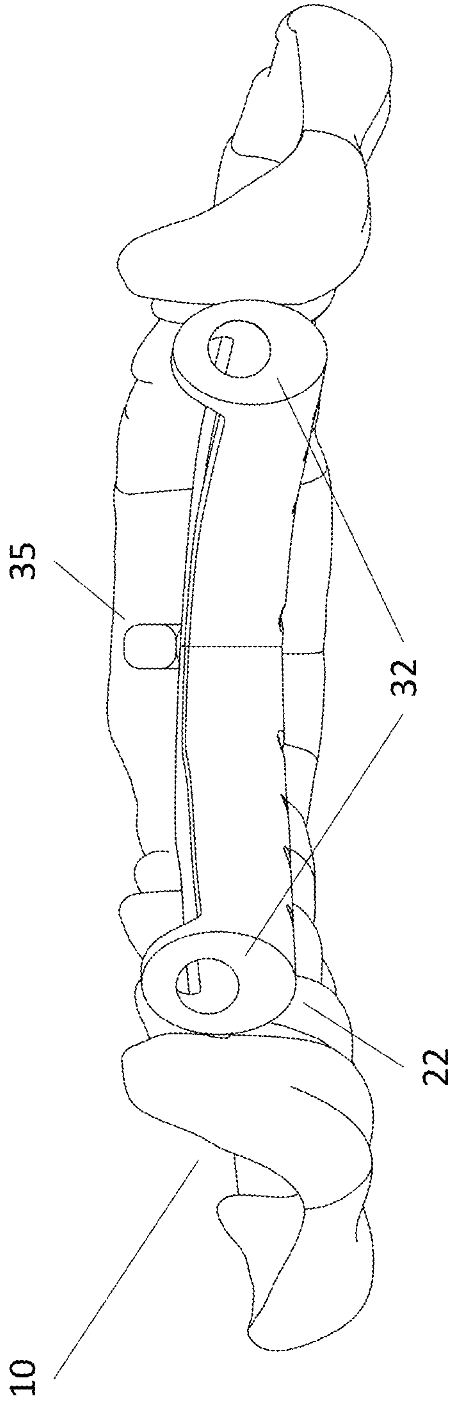
FIG. 32 shows a back view of the embodiment of FIG. 29, wherein the appliance is connected to the lower piece of the reservoir.
Figure 33:
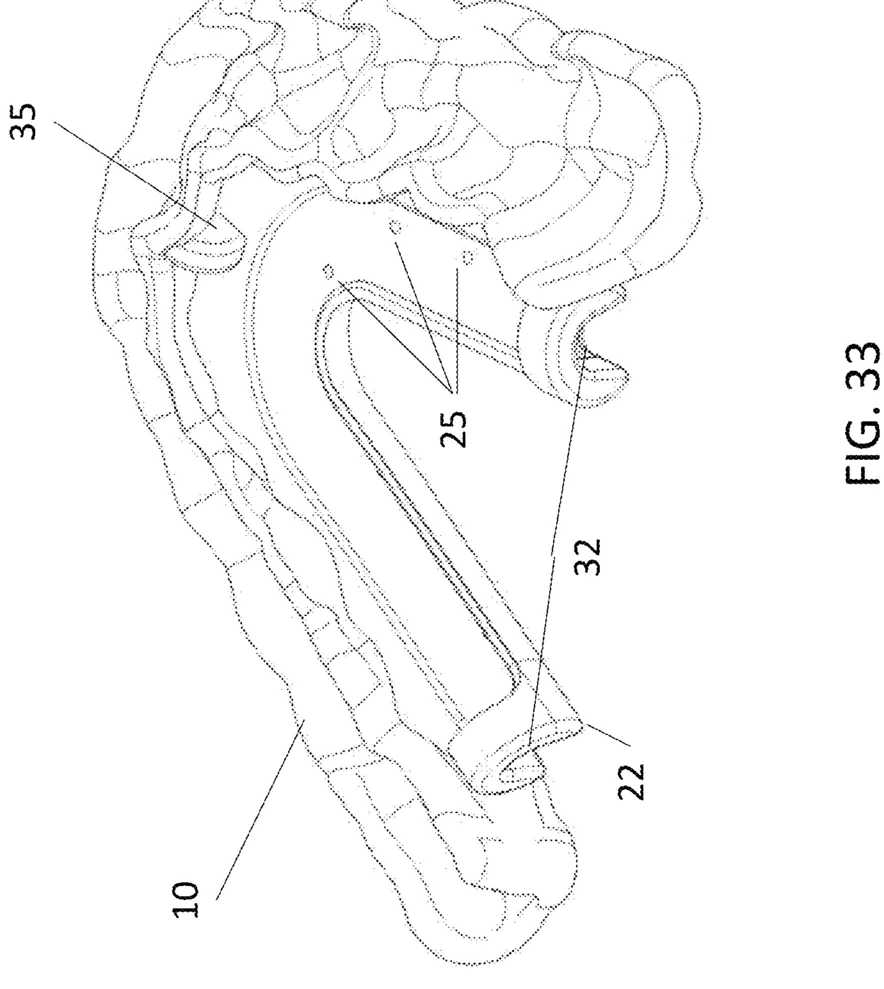
FIG. 33 shows a perspective view of another embodiment of the present teachings.
Figure 34:
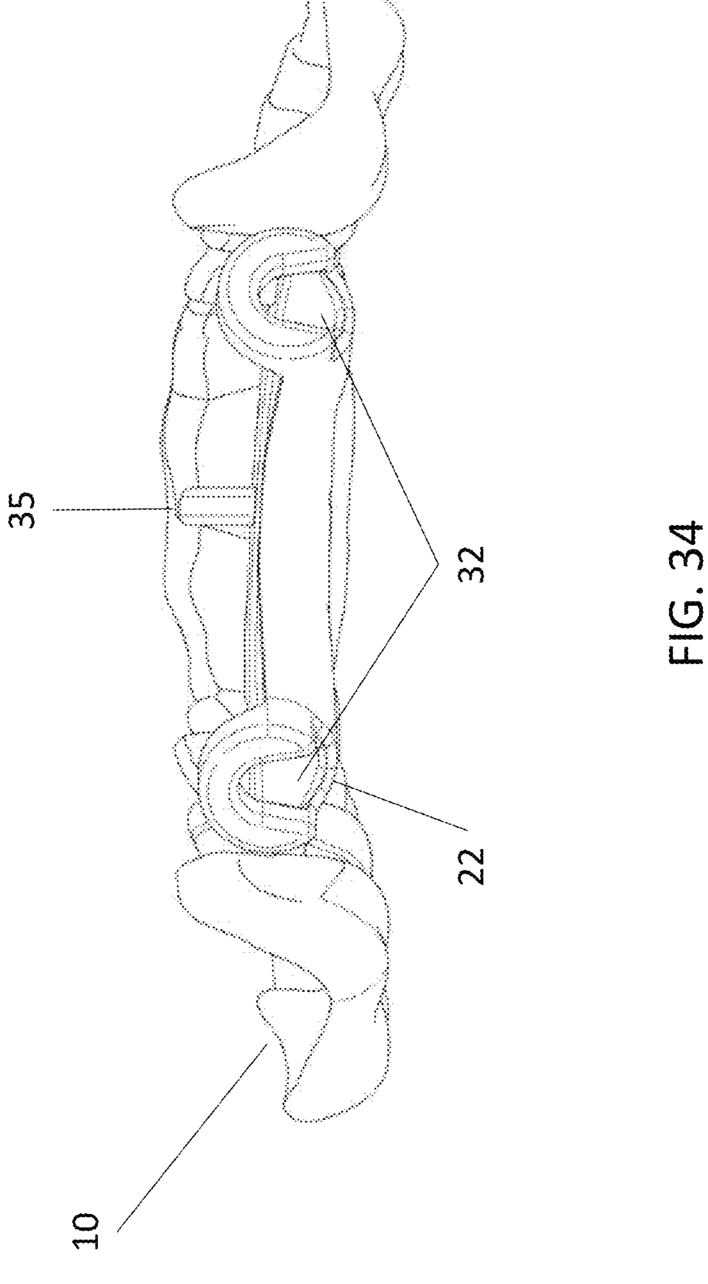
FIG. 34 shows a back view of the embodiment of FIG. 33.
Figure 35:
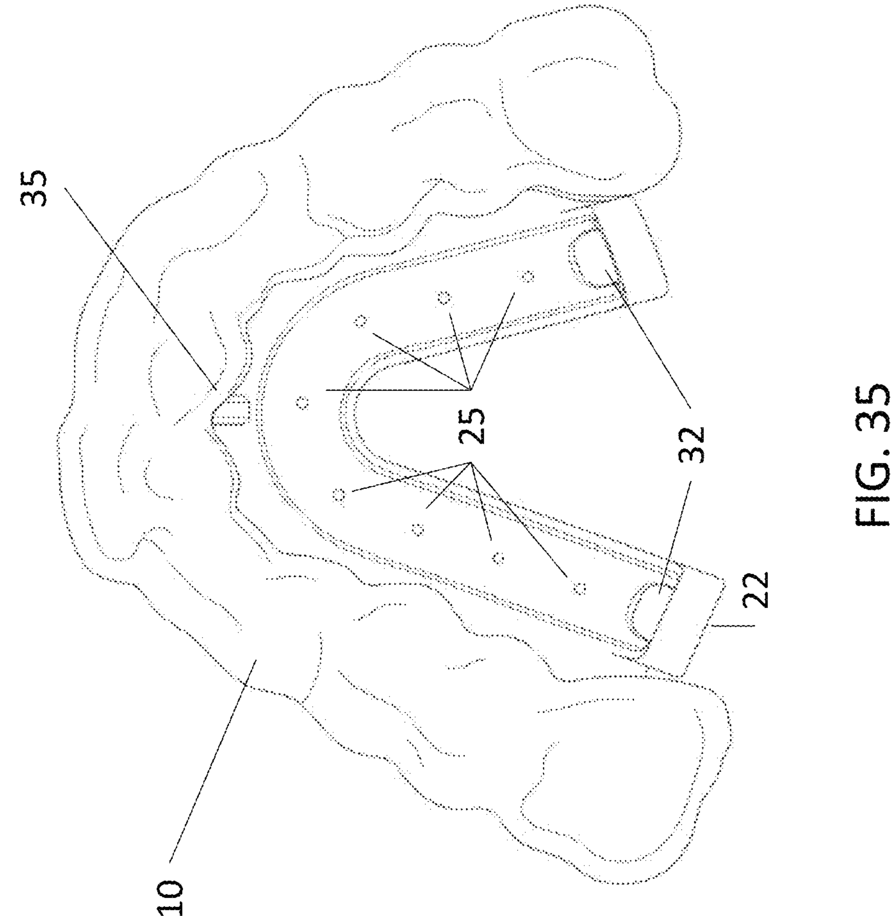
FIG. 35 shows a top view of the embodiment of FIG. 33.
Figure 36:
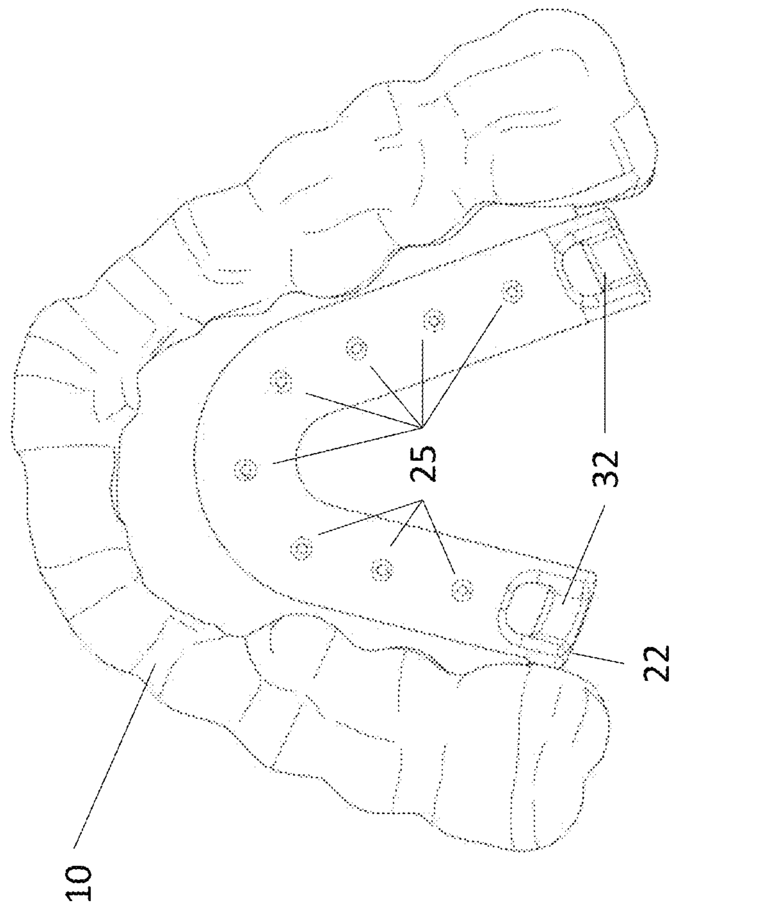
FIG. 36 shows a bottom view of the embodiment of FIG. 33.
Figure 37:
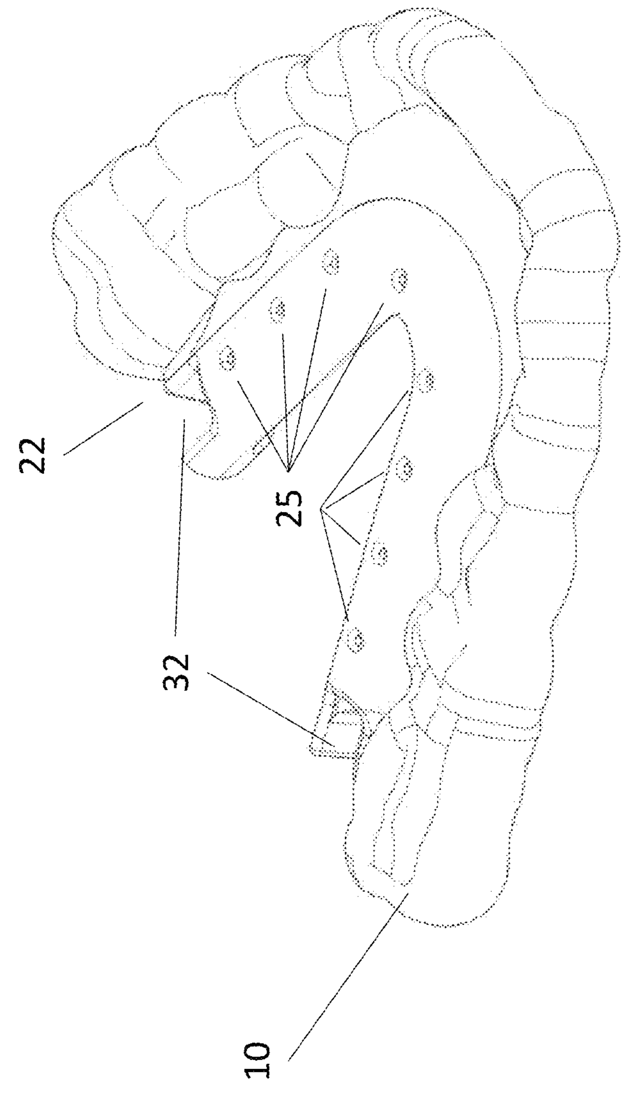
FIG. 37 shows a perspective view of the bottom of the appliance in the embodiment of FIG. 33.
Figure 38:
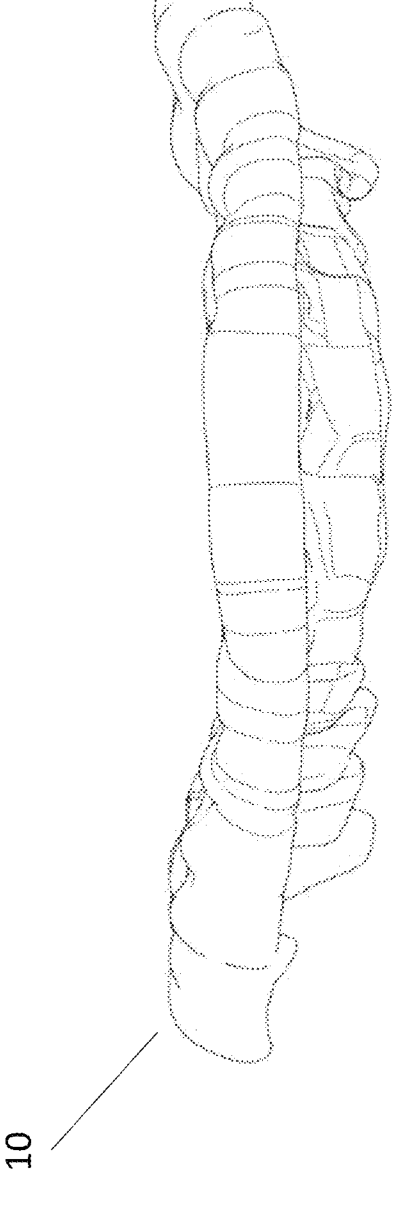
FIG. 38 shows a front view of the embodiment of FIG. 33, wherein the appliance is shown in an inverted orientation.

FIGS. 31 and 32 show one embodiment of an appliance 10 wherein the lower piece 22 of the reservoir 20 is attached to the appliance 10 and wherein the reservoir is an oval form. These figures depict the same embodiment shown in FIGS. 29 and 30. FIGS. 31 and 32 show a plurality of ports 25 on the lower piece 22 of the reservoir 20 for delivering the product 40 into the user's mouth. It is contemplated that these ports 25 may be in a substantially similar or different form from those which may be present on the upper piece of the reservoir. A difference in port size and/or numerosity between the upper 21 and lower 22 pieces of the reservoir 20 due to the effects of gravity or another outside force. For example, it may be desirable to reduce the size of ports 25 on the lower piece 22 of the reservoir 20 relative to the size of ports 25 on the upper piece 21 of the reservoir 20 to control for the amount of medication released into a user's mouth. It is also contemplated that, if more than one port 25 is present on either the upper piece 21 of the reservoir 20 or the lower piece 22 of the reservoir 20, the ports 25 may be of a different size relative to one another. For example, it may be desirable to alter the size of ports 25 relative to one another to provide more medication or hydration to a particular side of a user's mouth. Other reasons for altering the size and/or numerosity of ports 25 in the pieces 21, 22 of the reservoir 20 are also contemplated, including a situation where there may be multiple products 40 within the reservoir, such that it is desirable for one product 40 to be released into a user's mouth slower relative to the other product or products.

FIGS. 31 and 32 show one embodiment of a protrusion 35 capable of restricting movement of the upper piece 21 of the reservoir 20 while attached to the lower piece 22 of the reservoir according to the present teachings. The protrusion 35 seen in FIGS. 31 and 32 is affixed to the appliance 10 and is seen approximately at the apex of where the reservoir 20 bends. However, it is contemplated that a protrusion 35 may be located anywhere on the appliance 10, as well as on any piece 21, 22 of the reservoir. It is understood that a protrusion 35 will be placed in a location that would restrict movement of an upper piece 21 of the reservoir 20 when affixed to a lower piece 22 of the reservoir. The present teachings contemplate embodiments having more than one protrusion 35. A protrusion 35 may be of any size and of any material, and may be in the form of a detent.

FIGS. 33-38 show one embodiment of an appliance 10 wherein the lower piece 22 of the reservoir 20 is attached to the appliance 10 and wherein the reservoir 20 is in a circular form. All other forms described herein are contemplated for use with a reservoir 20 having a circular form.

Figure 39:
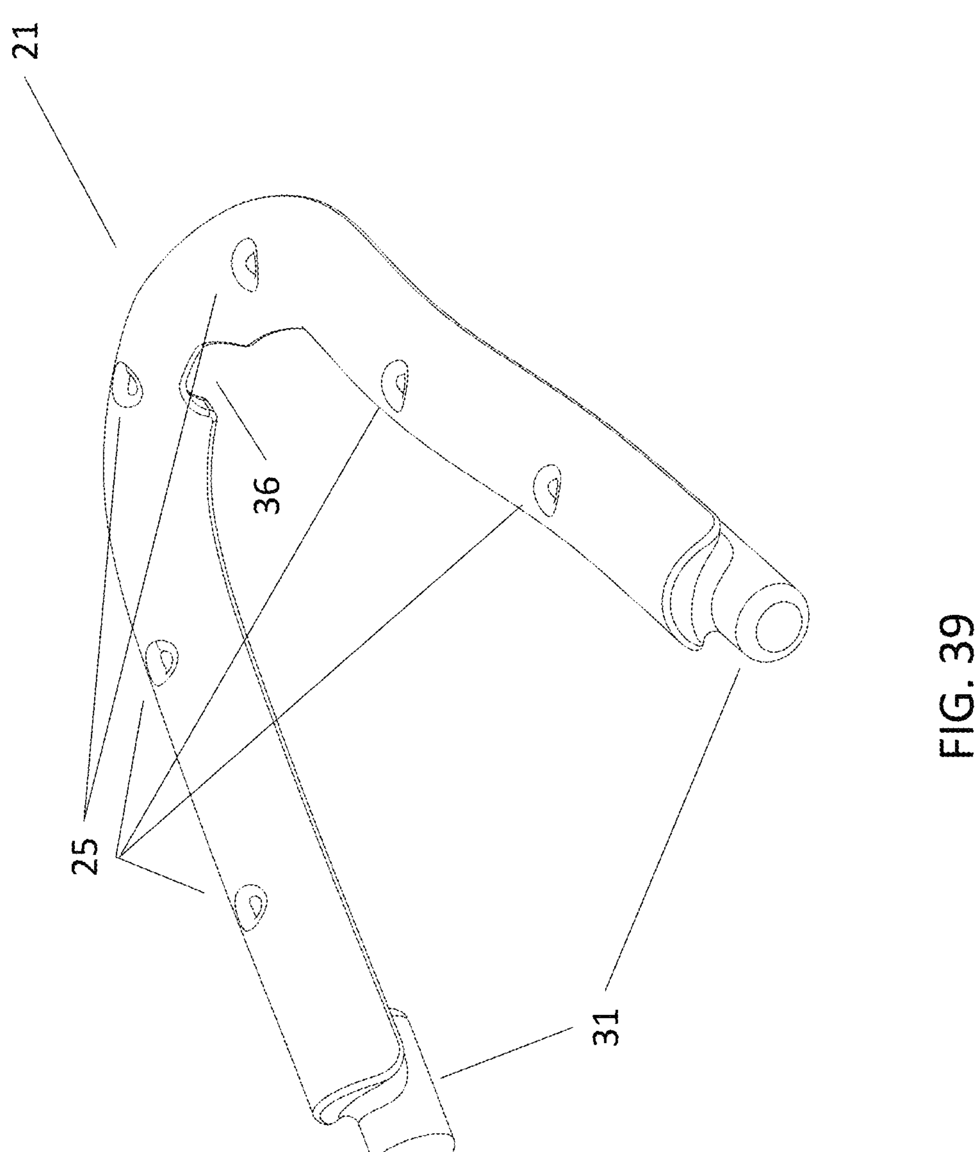
FIG. 39 shows a perspective view of the upper piece of the reservoir according to one embodiment of the present teachings.
Figure 40:
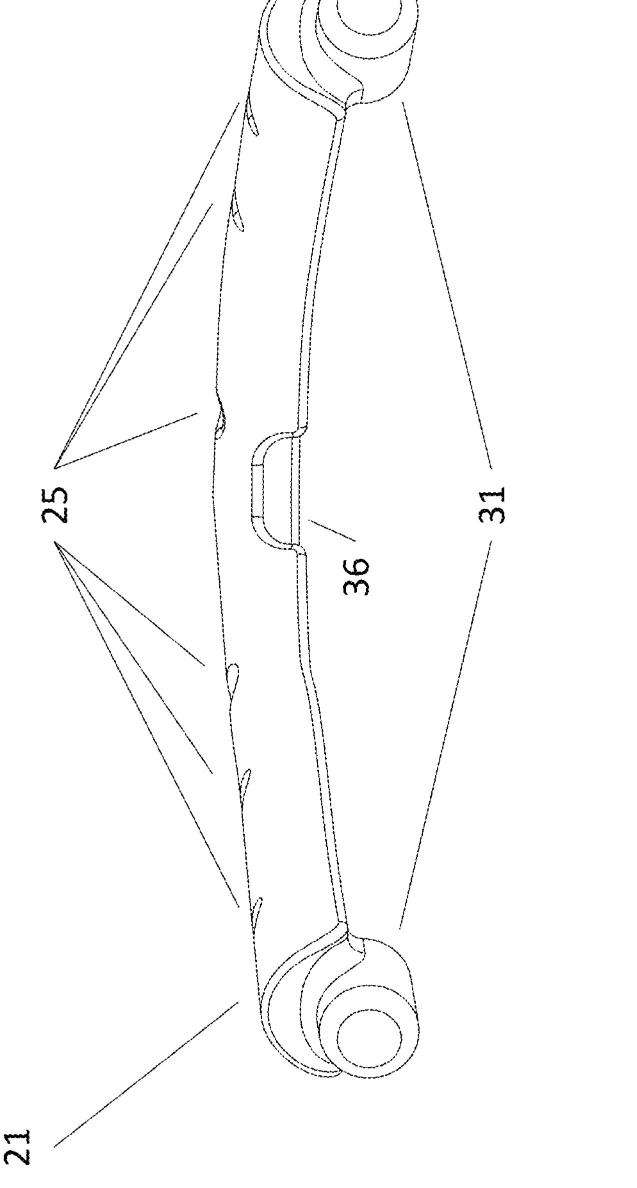
FIG. 40 shows a rear view of the upper piece of the reservoir shown in FIG. 39.
Figure 41:
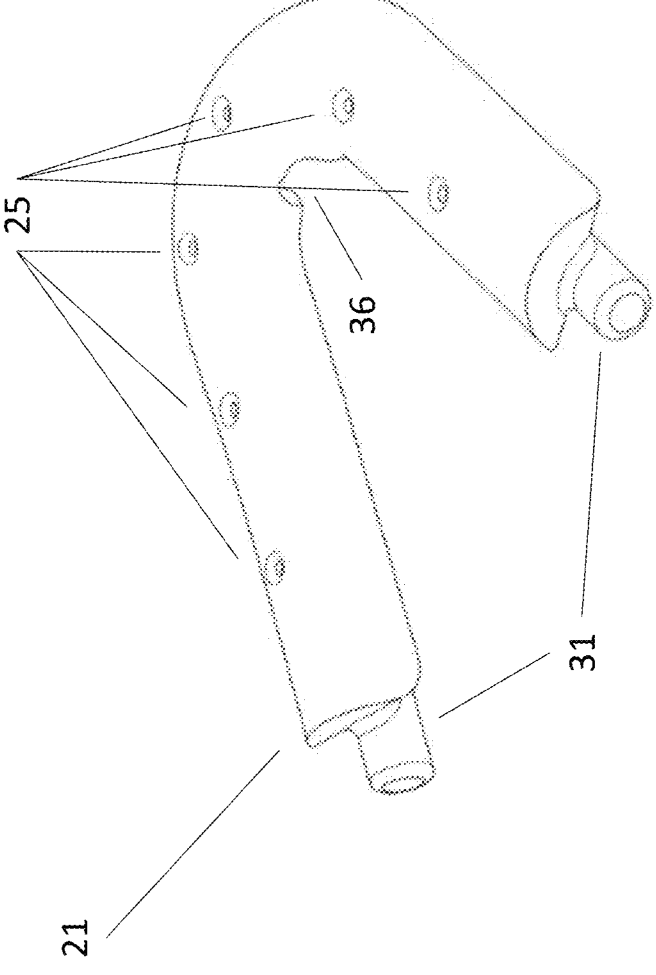
FIG. 41 shows a perspective view of the upper piece of the reservoir according to another embodiment of the present teachings.
Figure 42:
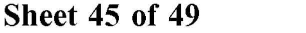
FIG. 42 shows a rear view of the upper piece of the reservoir shown in FIG. 41.
Figure 42:
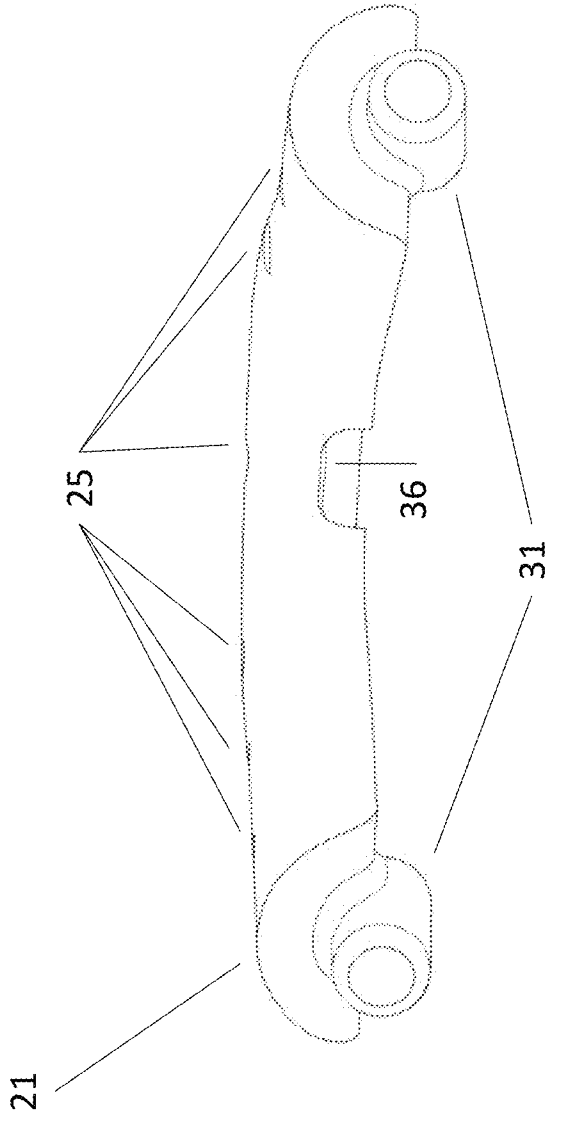
Figure 43:
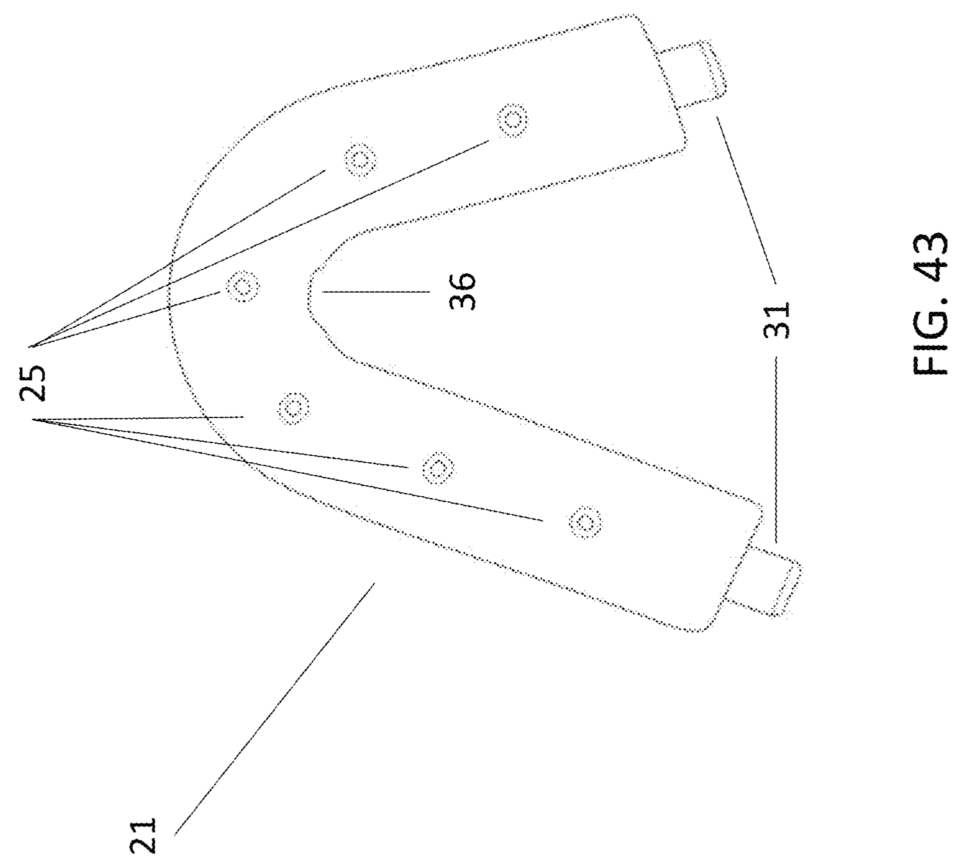
FIG. 43 shows a top view of the upper piece of the reservoir shown in FIG. 41.
Figure 44:
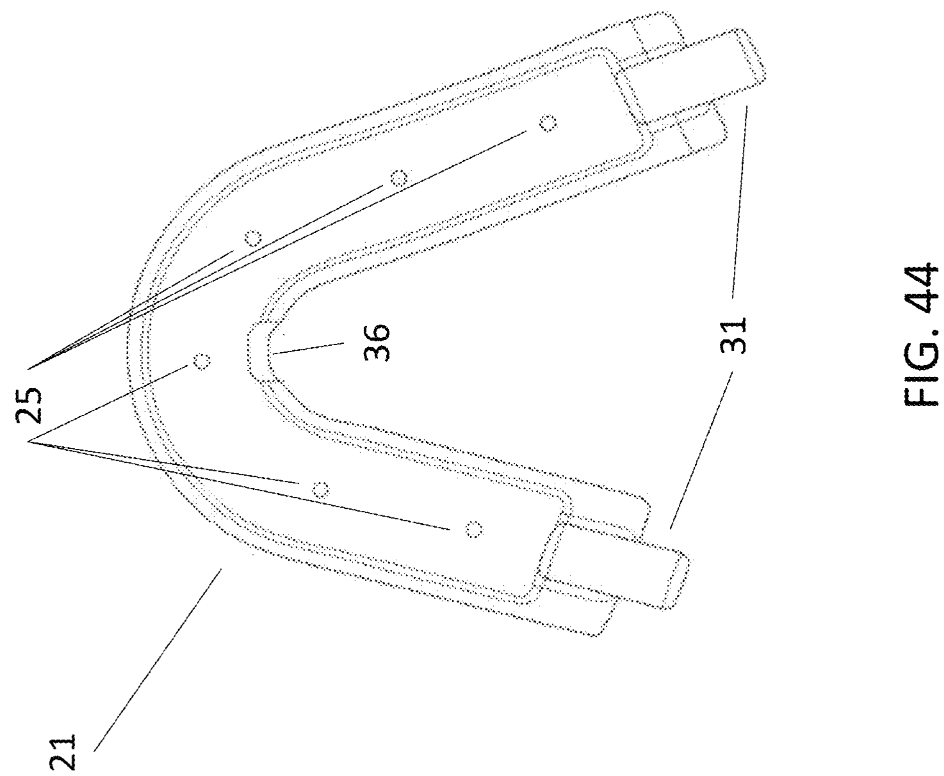
FIG. 44 shows a bottom view of the upper piece of the reservoir shown in FIG. 41.

FIGS. 39 and 40 show one embodiment of an upper piece 21 of a reservoir 20 according to the present teachings. The upper piece 21 of a reservoir 20 shown in FIGS. 39 and 40 is an embodiment according to the present teachings wherein the reservoir 20 is in the form of an oval. However, it is to be understood that other forms for the reservoir are contemplated, including forms where the reservoir 20 is circular. As shown in FIGS. 39 and 40, ports 25 may be present in an upper piece 21 of the reservoir 20. FIGS. 39 and 40 show a keyhole 36 near the bend of the upper piece 21 of the reservoir 20. This keyhole 36, depicted in FIGS. 39 and 40 as a cutout near the bend of the upper piece, may be in any shape. Its purpose is to provide an opening for a tool (not shown) to be inserted such that a user might remove the upper piece 21 of the reservoir 20 from the lower piece 22 of the reservoir. Other embodiments for a keyhole 36 according to the present teachings are contemplated, including embodiments having multiple keyholes 36 or keyholes having different shapes (e.g., semi-circles, circles, squares) or sizes. It is further contemplated that embodiments of the present teachings may have multiple keyholes 36 of different sizes relative to one another. Many purposes are contemplated for utilizing differences in keyhole 36 shapes, sizes, and/or numerosity, including but not limited to, use of a tool or instrument (not shown) for removal of the upper piece 21 of the reservoir 20 and designs that would allow a user to remove the upper piece 21 of the reservoir 20 using no tools (e.g., with a fingernail).

FIGS. 41 through 44 show one embodiment of an upper piece 21 of a reservoir 20 according to the present teachings. The upper piece 21 of a reservoir 20 shown in FIGS. 39 and 40 is an embodiment according to the present teachings wherein the reservoir is in a circular form. All other forms described in this specification are contemplated for use with a circular reservoir design, including but not limited to, the shape, size, and/or numerosity of ports 25, the shape, size, and/or numerosity of the pegs 31, and the shape, size, and/or numerosity of the keyhole(s) 36.

Figure 45:
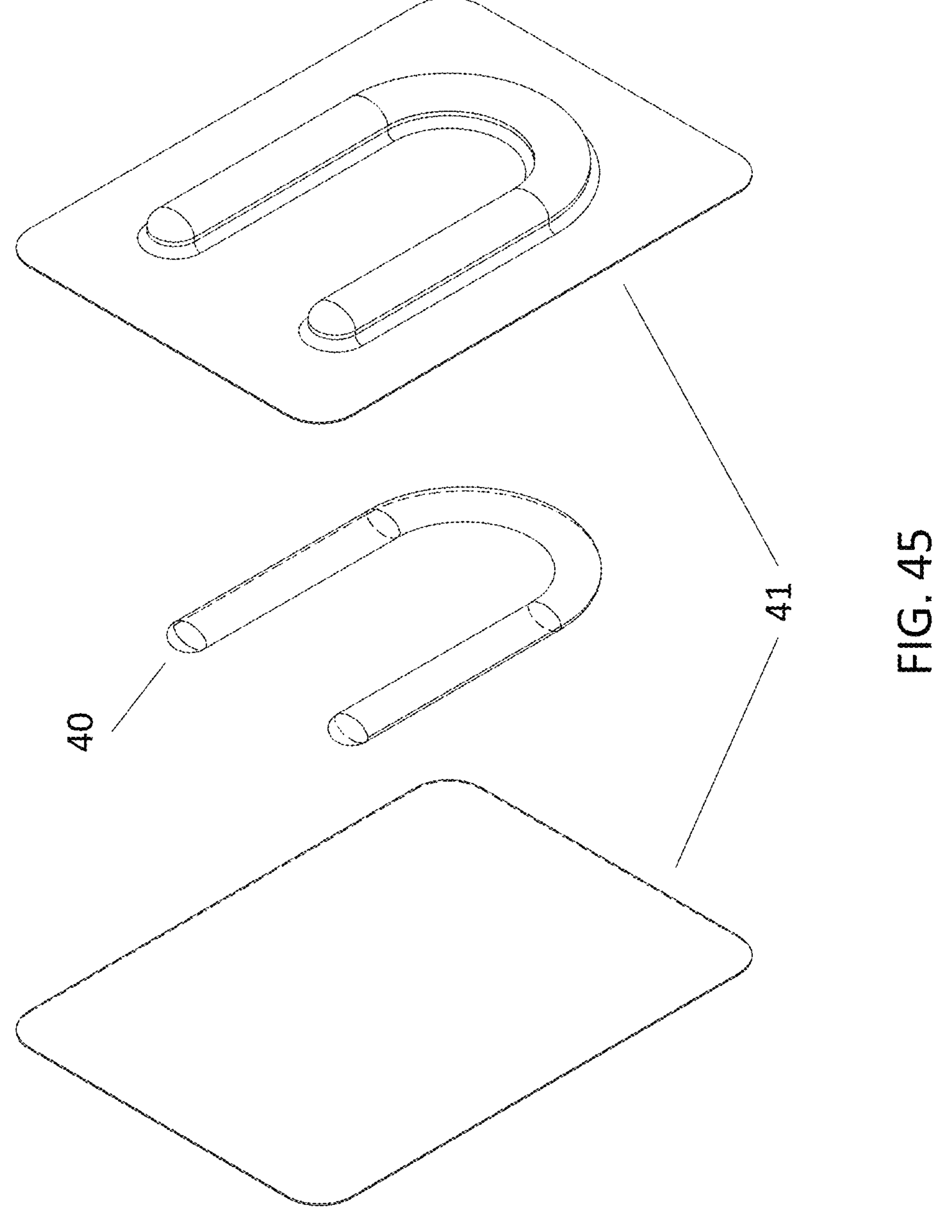
FIG. 45 shows a perspective view of a product according to the present teachings, which is designed for placement within the reservoirs of FIGS. 1-44.
Figure 46:
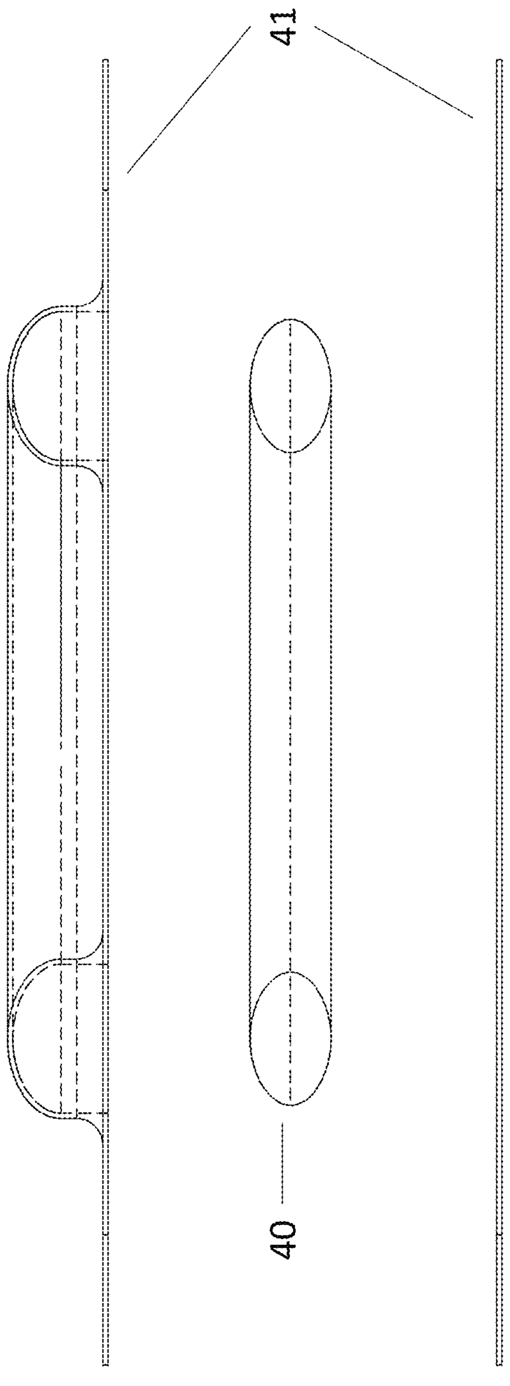
FIG. 46 shows a rear view of the product shown in FIG. 45.

FIGS. 45 and 46 show one embodiment of a product 40 for use in a system according to the present teachings. The embodiment depicted in FIGS. 45 and 46 is in a cartridge style for ease of refilling the reservoir and may be packaged in a blister pack 41 when not in use in a system according to the present teachings. The product to be refillable using a cartridge-style design may be any product discussed herein, and may include without limitation, foam infused with liquid or foam infused with hydrating gel. It will be understood by a person of ordinary skill in the art that the term "product" may be used to refer to other terms known in the art, including "drug delivery." The product may be any form of drug delivery, and may include post-operative anti-fungal drugs for treating infection. The product may be an oral treatment as described herein. Moreover, a system according to the present disclosure, which comprises the appliance with the reservoir and a product, may as also be referred to as a "platform." There are many methods of infusing gel contemplated, including vacuum infusion, pressure infusion, or a combination of both. Various foam densities and absorption properties are contemplated and may be altered to match the viscosity and/or other physical properties of the particular foam to be used.

The present teachings also provide an oral appliance for time delivery of a pharmaceutical. As used herein, a "pharmaceutical" may refer to an "oral treatment" as described elsewhere herein and/or as understood by persons of ordinary skill in the art. As used herein, a "hole" may also refer to a port as described elsewhere herein. The appliance includes a first component having an inner edge and provided in plastic moldable at a first temperature which can be formed into a custom shape to match at least a portion of the upper teeth and gums of a user. The appliance also includes a second component having an outer edge and provided as plastic which retains its shape at the first temperature and includes a channel or reservoir. A plurality of holes is formed in the lower and inner side wall of the channel or reservoir of the second component. An individual charge of a pharmaceutical is disposed in the channel for time delivery to a user through the plurality of holes. The appliance also includes a fin extending from the outer edge of the second component such that when the second component is placed within the first component, the fin is embedded within and the inner edge of the first component as it is molded.

The first component is formed into the custom shape from one or more sheets of plastic. The one or more sheets of plastic are laid over a plaster cast or other suitable mold of the user's upper teeth and gums. In some embodiments, the first component is formed into the custom shape by 3-D printing. The 3-D printer may be operated according to a digital map of the user's upper teeth and gums. Alternatively, the 3-D printer may be manually operated by an dental physician (e.g., dentist), dental technician, prosthetic maker, or other suitable person or entity. The second component may be selected from a plurality of second components having standardized shapes and sizes and based on the user's upper teeth and gums.

The pharmaceutical charge may be provided as a gel. The oral appliance may further comprise a rigid cover which snap-fits over the channel of the second component to retain the gel in the channel. In other embodiments, the pharmaceutical charge may be provided as an impregnated foam pre-sized and pre-shaped to fit in the channel of the second component.

The present teachings also provide a method of making an oral appliance for time delivery of a pharmaceutical. The method comprises the steps of: providing a pharmaceutical material for treating dry mouth or sore throat; making a model of at least a portion of a user's upper teeth and gums; based on the size and shape of the model, selecting a rigid channel component from a plurality of standardized different shape and size channel components such that an outer edge of the channel component fits within an inner edge of the user's upper teeth and gums; heating or vacuum forming a plastic material until it is moldable; using the model to form the heated or vacuumed plastic material into a custom component which fits over the upper teeth and gums of the user; and embedding an outer fin-like structure on the rigid channel component into an inner edge of the custom component while heating or vacuuming the plastic material to form a single unitary structure which both provides both a custom fit to the user's upper teeth and gums and a rigid channel to receive the pharmaceutical material therein.

With such method, the pharmaceutical material may be provided as a gel. The method also includes the steps of inserting the gel into the channel of the rigid component; and snap-fitting a rigid cover over the channel after inserting the gel. In other embodiments, the pharmaceutical material may be provided embedded in a semi-rigid foam piece sized and shaped for an interference fit with the channel.

The method according to the present teachings may further comprise the step of forming holes in the lower and inner side surface of the channel for time delivery of the pharmaceutical. The method may include the step of visiting a dental technician to make the model. For example, the dental technician makes a 3-D map of the user's upper teeth and gums. The method then includes the step of 3-D printing the custom component. In other embodiments, the dental technician makes a plaster cast or other mold of the user's upper teeth and gums. Accordingly, the method includes the step of laying at least one sheet of moldable plastic over the plaster cast to form the custom component.

The devices disclosed above may be manufactured utilizing 3D scanner additive manufacturing, vacuum forming, thermoforming, wax molding, CNC milling machines, other dental appliance forming methods, or a combination of the aforementioned.

In some embodiments, the appliance may be custom-fitted to a user using a boil-and-bite process. With such process, the appliance is momentarily submerged into boiling water, a process which will cause a portion of the appliance (i.e., the body) to soften, while another portion (i.e., reservoir) substantially retains its shape. The body of the appliance may be made of a first material that becomes moldable when heated above a molding temperature, while the reservoir is made of a second material which retains its shape and structure at said molding temperature, and preferably, at a temperature at least 10 degrees (e.g., 20 degrees, 30 degrees, 40 degrees, 50 degrees) above said molding temperature (Fahrenheit scale). The molding temperature is greater than the average normal oral temperature (e.g., 98.6° F.). The molding temperature may be at least 100° F., for example 100° F., 105° F., 110° F., or 115° F. After the heating or boiling step, the appliance is placed onto the user's teeth, and the user bites down firmly. The user's teeth will leave an impression. The user's act of biting down into the body of the appliance during the boil-and-bite process will not adversely affect any part of the reservoir. Thereafter, the appliance is removed from the user's teeth and left to cool down, for example for at least 5 minutes. During the cooling process, the body of the appliance will become more rigid and retain the shape and contour of the user's teeth. In other embodiments, instead of using boiling water, the appliance may be subjected to heating or microwaving in order to make the body of the appliance moldable. Moreover, it is noted that the appliance can undergo the above process multiple times after the first instance. This allows for the appliance to be periodically adjusted to the user's teeth since the structure/alignment of the user's teeth may change (e.g., shifting of teeth may occur throughout the life of the user). This ensures for continuous accurate fitting of the appliance to the user's teeth.

The devices disclosed above may be refilled using in-house dispensing caps fitted on product containers, pre-loaded syringes, single use squeeze containers, single use or reusable impregnated foam or mesh inserts, single use or reusable cartridges, tablets, time-release products, aerosols, or sprays. The refilling method used may depend on the product being loaded and/or the specifics of the embodiment of the device.

Although the invention has been illustrated and described herein with reference to a preferred embodiment and a specific example thereof, it will be readily apparent to those of ordinary skill in the art that other embodiments and examples may perform similar functions and/or achieve user experiences. All such equivalent embodiments and examples are within the spirit and scope of the present invention, are contemplated thereby, and are intended to be covered by the disclosure.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention", unless context clearly indicates otherwise.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

What is claimed is:

1. A system for delivering an oral product, comprising:

an appliance capable of fitting inside a user's mouth, the appliance having a body that is configured to cover the user's maxillary teeth;

the appliance having a reservoir for receiving a product;

the reservoir having at least one port for delivering the product into the user's mouth at a predetermined rate;

the reservoir comprising a first part and a second part, wherein the second part is affixed to the body and wherein the first part is releasably attached to the second part to form a tubular cavity that extends alongside a lingual side of the body;

wherein the reservoir is U-shaped and is configured to extend such that one end of the reservoir corresponds to a maxillary molar and a second opposite end of the reservoir corresponds to an opposite maxillary molar; and wherein the opposite ends of the U-shaped reservoir each include a peg-and-hole connector to releasably attach the first part to the second part.

2. The system of claim 1, wherein the peg-and-hole connectors form a seal at the opposite ends of the reservoir to prevent egress of the product from the reservoir.

3. The system of claim 2, wherein the pegs have a circular cross-sectional shape, and wherein the holes have a shape of a circle corresponding to the circular cross-sectional shape of the pegs.

4. The system of claim 2, wherein the pegs have an elliptical cross-sectional shape, and wherein the holes have a shape of an ellipse corresponding to the elliptical cross-sectional shape of the pegs.

5. The system of claim 2, wherein the pegs mate with the holes to create a friction fit.

6. The system of claim 2, wherein each end of the first and second parts includes a surface, and wherein the ends of the pegs are flush with their respective mated holes.

7. The system of claim 1, wherein the first part has two ends, each end of the first part having a peg;

wherein the second part has two ends, each end of the second part having a hole; and wherein the pegs are insertable into the holes to provide a secure attachment of the first part to the second part.

8. The system of claim 1, wherein an exterior of the first part is flush with an exterior of the second part to form a flush surface at each peg-and-hole connector.

9. The system of claim 1, wherein the first part has two ends, each end of the first part having a hole;

wherein the second part has two ends, each end of the second part having a peg;

wherein the pegs are insertable into the holes to provide a secure attachment of the first part to the second part.

10. The system of claim 1, wherein the reservoir has a plurality of ports for delivering the product into the user's mouth, wherein the reservoir is configured in a shape of an arch, and wherein the ports are distributed along the arch of the reservoir.

11. The system of claim 10, wherein at least one of the plurality of ports is positioned at an apex of the arch.

12. The system of claim 10, wherein a first group of the plurality of ports is formed in the first part, and a second group of the plurality of ports is formed in the second part.

13. The system of claim 10, wherein all of the plurality of ports are formed in either the first part or the second part.

14. The system of claim 1, wherein the body includes an interior surface configured to contact the user's maxillary teeth and an exterior surface opposite the interior surface, wherein the appliance comprises at least one protrusion disposed on the exterior surface along a palate-side of the body, and wherein the protrusion extends toward the first part of the reservoir to hold the first part against the second part of the reservoir, thereby restricting movement of the first part of the reservoir relative to the second part of the reservoir.

15. The system of claim 14, wherein the at least one protrusion is sized to apply pressure on the first part towards the second part.

16. The system of claim 14, wherein the body is configured in a shape of an arch corresponding to the user's maxillary teeth, and wherein the at least one protrusion is positioned at an apex of the arch.

17. The system of claim 14, wherein the protrusion is a detent.

18. The system of claim 1, wherein the first part of the reservoir comprises at least one protrusion disposed on an exterior of the first part, wherein the protrusion extends in a direction towards an exterior surface of the body and contacts the exterior surface to hold the first part against the second part.

19. The system of claim 1, wherein at least one of the first part or the second part of the reservoir comprises a keyhole opening, the keyhole opening being configured to receive an instrument for detaching the first part of the reservoir from the second part of the reservoir.

20. An oral care system, comprising:

an appliance capable of fitting inside a user's mouth, the appliance having a body that is configured to cover the user's teeth;

the appliance having a reservoir;

the reservoir having at least one port for delivering a liquid and/or gel into the user's mouth at a predetermined rate;

the reservoir comprising a first part and a second part, wherein the second part is affixed to the body and wherein the first part is releasably attached to the second part to form a tubular cavity that extends alongside a lingual side of the body;

wherein the reservoir is U-shaped and is configured to extend such that one end of the reservoir corresponds to a molar tooth and a second opposite end of the reservoir corresponds to an opposite molar tooth; and wherein the opposite ends of the U-shaped reservoir each include a peg-and-hole connector to releasably attach the first part to the second part; and an oral product that is insertable to the reservoir, the oral product being in a form of a liquid and/or gel.

21. The oral care system of claim 20, wherein the oral care product is an oral moisturizer.

* * * * *